United States Patent [19]

Sakurai et al.

[11] Patent Number: 5,474,593
[45] Date of Patent: Dec. 12, 1995

[54] AGENT FOR TREATING METAL IONS IN AN AQUEOUS SOLUTION, PROCESS FOR PRODUCING THE METAL ION-TREATING AGENT AND METHOD FOR TREATING METAL IONS IN AN AQUEOUS SOLUTION

[75] Inventors: Tatsuya Sakurai; Hiroshi Fujimura; Koji Kusabe; Keishiro Hata, all of Kawasaki, Japan

[73] Assignee: Kawasaki Kasei Chemicals Ltd., Tokyo, Japan

[21] Appl. No.: 302,260

[22] Filed: Sep. 8, 1994

[30] Foreign Application Priority Data

Sep. 8, 1993 [JP] Japan ................................. 5-222951
Nov. 17, 1993 [JP] Japan ................................. 5-323045

[51] Int. Cl.⁶ .................................................. C22B 15/12
[52] U.S. Cl. ............................. 75/721; 75/713; 75/733; 423/23; 423/DIG. 14; 526/915
[58] Field of Search .................. 75/713, 733, 721; 526/915; 423/DIG. 14, 23

[56] References Cited

U.S. PATENT DOCUMENTS

| | | |
|---|---|---|
| 3,820,979 | 6/1974 | Manassen . |
| 3,969,244 | 7/1976 | Kobayashi et al. . |
| 4,032,331 | 6/1977 | Gerlach ........................... 75/373 |
| 4,032,332 | 6/1977 | Gerlach ........................... 75/373 |
| 4,033,765 | 7/1977 | Gerlach ........................... 75/373 |
| 4,073,748 | 2/1978 | Brown et al. . |
| 4,095,975 | 6/1978 | Rappas et al. . |
| 4,303,441 | 12/1981 | Lamisse ........................... 75/733 |
| 4,311,811 | 1/1982 | Manziek . |
| 4,311,812 | 1/1982 | Manziek . |
| 4,855,114 | 8/1989 | Gefvert .................... 423/DIG. 14 |
| 4,943,420 | 7/1990 | Mitschker ................ 423/DIG. 14 |
| 4,965,054 | 10/1990 | Lewis ...................... 423/DIG. 14 |

FOREIGN PATENT DOCUMENTS

| | | |
|---|---|---|
| 2249101 | 5/1975 | France . |
| 2670803 | 6/1992 | France . |
| 49-73846 | 7/1974 | Japan . |
| 50-61391 | 5/1975 | Japan . |
| 50-144685 | 11/1975 | Japan . |
| 52-16717 | 5/1977 | Japan . |
| 54-40285 | 3/1979 | Japan . |
| 5-21627 | 3/1993 | Japan . |

OTHER PUBLICATIONS

Oxidation–Reduction Resin, edited by Kuniharu Kojima, et al. Published By Kodansha, p. 71.
Pure Applied Chemistry, vol. 38, pp. 181–199, 1974 Oxidation–Reduction Polymers.
Encyclopedia Of Polymer Science And Engineering, vol. 5, p. 744, lines 12–15, 1986 Electron–Transfer Polymers.
Ullmann's Encyclopedia Of Industrial Chemistry, vol. A20, pp. 63–65, 1992.
Silver Recovery For Environmental Compliance In Photographic Processing, Journal Of Imaging Science and Technology, vol. 37, No. 4, pp. 374–379, 1993.

*Primary Examiner*—Peter D. Rosenberg
*Attorney, Agent, or Firm*—Oblon, Spivak, McClelland, Maier & Neustadt

[57] ABSTRACT

An agent for treating metal ions in an aqueous solution, comprising a solid porous carrier and, supported thereon, an organic reagent (hereinafter referred to as a "redox reagent") which is capable of converting metal ions (inclusive of metal complex ions) contained in an aqueous solution to zero valent metal or monovalent metal ions by a redox reaction and which is capable of carrying out oxidation-reduction reversibly.

24 Claims, 2 Drawing Sheets

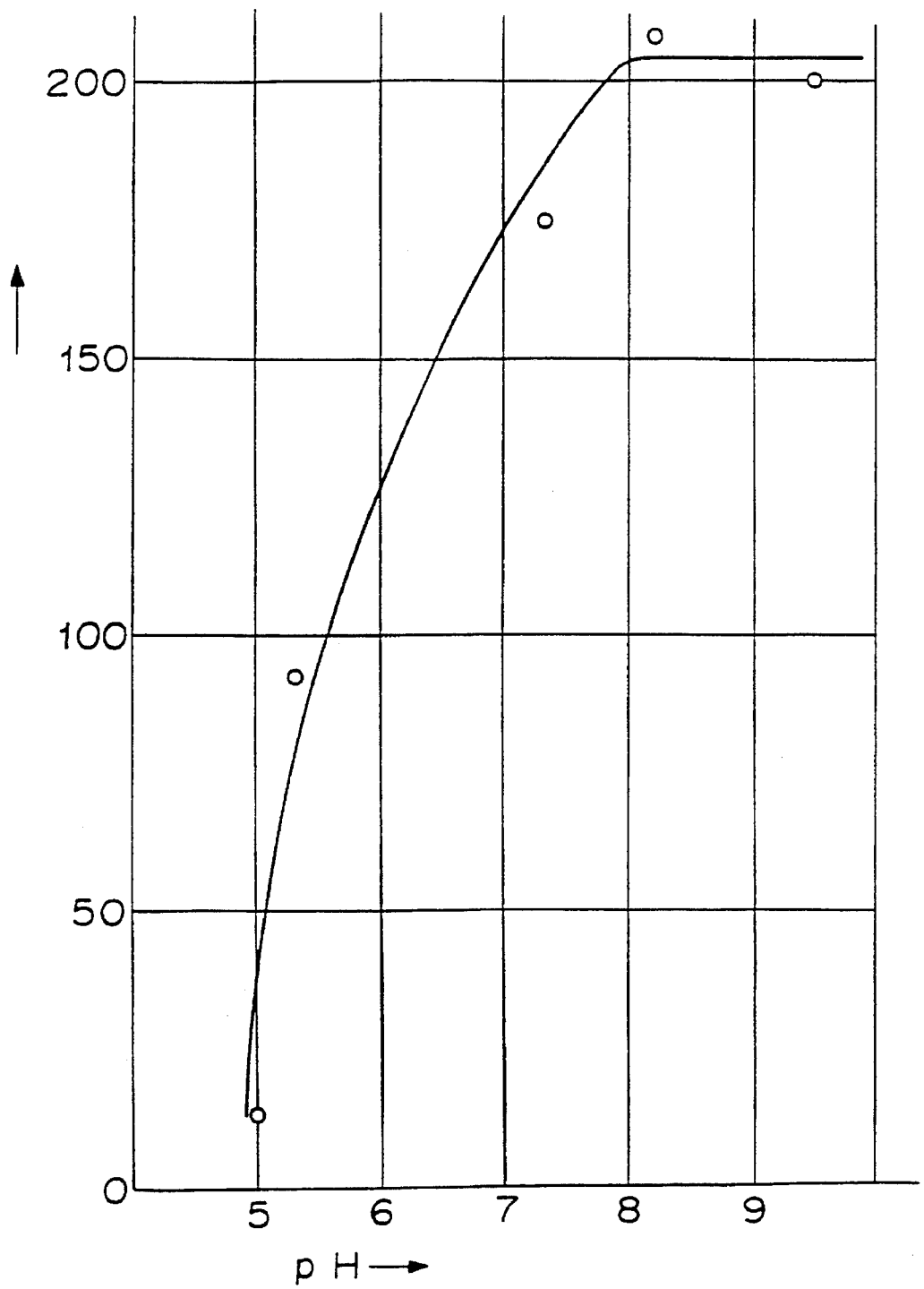

AGENT FOR TREATING METAL IONS IN AN AQUEOUS SOLUTION, PROCESS FOR PRODUCING THE METAL ION-TREATING AGENT AND METHOD FOR TREATING METAL IONS IN AN AQUEOUS SOLUTION

The present invention relates to an agent for treating metal ions to recover metals which are valuable from the viewpoint of both resources and economy, from various aqueous solutions containing metal ions, such as a metal ion-containing waste water discharged from a process for producing a compound containing e.g. copper or mercury by using a copper or mercury compound, a metal ion-containing waste water discharged at the time of producing electronic parts, a metal ion-containing waste water discharged from a process of using an industrial catalyst or from treatment of a used catalyst, and a waste fixing solution containing a metal complex salt such as a silver complex salt discharged from photograph industry, to a process for producing such a metal ion-treating agent, and to a method for treating metal ions in aqueous solution such as various waste waters. More particularly, it relates to a treating agent useful for recovering heavy metal ions such as copper or mercury ions and/or so-called noble metal ions such as ions of gold, silver, platinum, palladium, rhodium or ruthenium, contained in an aqueous solution, to a process for producing such a treating agent and to a method for such treatment.

Further, the present invention relates to a technology wherein a selective reduction reaction is conducted by means of a metal ion-treating agent of a redox reagent of hydroquinone type comprising a solid porous carrier and anthraquinone or its derivative supported on the carrier, so that metal ions contained in a waste water are selectively converted to monovalent metal ions or zero valent metals in the flowing aqueous solution, and if necessary, monovalent metal ions separated, accumulated and captured on the solid porous carrier are eluted out of the system by supplying an eluent solution and recovered as the monovalent metal ions, whereby a waste water which is likely to adversely affect underwater inhabitants, can be made harmless, and the metal ion-treating agent having the monovalent metal ions eluted or oxidized to lose the reducing ability, can be reduced for restoration and reuse.

In Japan, most metals are imported in recent years. Large amounts of noble metals are used for electric parts and for photosensitive materials to be used in photograph industry and for industrial catalysts such as industrial oxidation catalysts and reduction catalysts to be used for automobiles or oxidation treatment in industrial waste gases. Accordingly, waste waters containing heavy metal ions or noble metal ions are discharged during their production or during their recovery. Further, waste waters containing large amounts of valuable metal resources are discharged also from fixing processes in the photograph industry. In this country with poor resources, it is important to recover and reuse these metal resources.

Most of these metals are contained in the form of metal ions or metal complex ions (hereafter both will generally be referred to as metal ions) in aqueous media such as aqueous solutions. As a method for recovering such metal ions, there is, for example, (1) a method of forming a precipitate by e.g. reduction or an insoluble salt from an aqueous solution and separating, purifying and recovering a metal such as a noble metal from other inclusions, (2) a method of recovering them by having them, adsorbed on an ion exchange resin or a chelate resin, (3) a method for recovering them by having them adsorbed on an oxidation-reduction resin, or (4) a method of electrolytically reducing metal ions and recovering in the form of a metal (e.g. Austin C. Cooley, J. Imaging Science and Technology 37 (4), 374–379(1993)).

By the method (1), metal ions are still likely to remain in the waste liquid, and the recovery rate of metal is rather poor. The method (2) has drawbacks such that selectivity is not so high in a case where plural different types of metal ions are co-existent, or when metal ions are in the form of complex it is difficult to remove them by a chelate resin. The method (3) has a difficulty such that no practical method is available for direct alkylation or alkenylation of quinone or anthraquinone to produce a monomer such as monovinylanthraquinone useful as the starting material for production of the oxidation-reduction resin and the number of process steps are required, whereby the monomer will be very expensive. Further, when such a monomer is polymerized with e.g divinylbenzene, it is difficult to form a product of bead form, and no practical product has been prepared. The method (4), i.e. an electrolytic method, is effective for recovery of highly concentrated metal ions, but in the case of metal ions at a low concentration, the current efficiency tends to be poor, and it is practically impossible to accomplish treatment to a metal ion concentration of not higher than a few ppm which is required e.g. by waste water regulation.

With respect to a method for reducing polyvalent metal ions in an aqueous solution by means of a redox reagent of hydroquinone-quinone type, a method is known wherein polyvalent metal ions in an aqueous solution are reduced to metals such as copper, silver and mercury by means of an organic solvent solution of an anthraquinone derivative of a hydroquinone type, except for anthraquinone, then separated and recovered (U.S. Pat. No. 3,820,979). The redox reagent used here which has been completely oxidized once, is reduced by hydrogenation for restoration and reused as a solution of the redox reagent in an organic solvent. An assumed behavior of a typical redox reagent of hydroquinone-quinone type is as shown below.

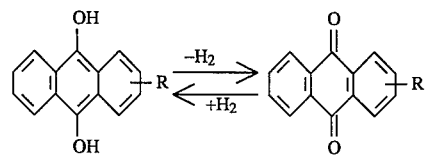

Such a redox reagent used to be used always as dissolved in a solution and thus had a drawback that it was lost together with the solution.

As redox reagents of anthraquinone and its derivatives, anthraquinone, 2-methylanthraquinone, 2-ethylanthraquinone, 2-propylanthraquinone, 2-isopropylanthraquinone, 2-t-butylanthraquinone, 2-amylanthraquinone, tetrahydroanthraquinone and 2-substituted tetrahydroanthraquinone are, for example, known. Each of these reagents can readily be prepared by a condensation reaction of butadiene or a diene compound having a substituent with naphthoquinone (Diels Alder reaction) or a condensation reaction of phthalic anhydride with the corresponding alkylbenzene.

The above mentioned U.S. Pat. No. 3,820,979 discloses these anthraquinone derivatives except for anthraquinone and examples of organic solvent solutions to be used in combination therewith. With respect to the solvent to be used for dissolving the anthraquinone derivative, there has been a drawback that it is required to use a mixture of polar or non-polar solvents having high boiling points. For example, as the non-polar organic solvent, alkyltoluene, alkylnaphthalene or diphenyl is disclosed, and as the polar organic solvent, octanol, ethylhexanol or diisobutyl ketone is disclosed. Further, it is disclosed to use also an ester such as a dialkyl phthalate, diallyl phthalate and an alkyl benzoate or benzyl acetate.

In the case of the above mentioned U.S. Pat. No. 3,820,979, in order to use such a redox reagent in the form of an organic solvent solution, it is necessary to overcome difficulties such as the flammability, and the danger or disadvantage in use such as evaporation loss. Further, from the viewpoint of the process, there is a practical difficulty in separating co-existing three phases i.e. an aqueous solution phase, an organic solvent phase and a solid phase to be recovered, as reduced to a metal, and there is a problem that the amount of the redox reagent lost as included in the solid phase residue, gives a serious influence over the economy of the process. Further, when it is used for the recovery of copper ions in a waste water, removal of copper ions tends to be inadequate, and a part thereof tends to be reduced to metal, whereby the redox reagent is excessively consumed.

Under these circumstances, it is an object of the present invention to provide an agent for treating metal ions in an aqueous solution, which is capable of selectively and efficiently recover metal ions in an aqueous solution, particularly heavy metal ions such as copper ions or mercury ions, or noble metal ions such as ions of gold, silver and platinum group elements, which is capable of treating an aqueous solution such as a waste water to a concentration of a harmless level, which can be conveniently prepared from a raw material which is readily available, so that it can be prepared economically at a relatively low cost, a process for its production and a method for effectively using such a metal ion-treating agent.

The present inventors have conducted expensive studies for using a redox reagent as the metal ion-treating agent to repeatedly conduct treatment for reducing and capturing metal ions in a waste water completely or economically advantageously and to facilitate its handling. As a result, they have succeeded in preparing a metal ions-treating agent which is capable of selectively reducing bivalent metal ions in a waste water to monovalent metal ions repeatedly and which is capable of recovering metal ions in a waste water as monovalent metal ions, and have found a specific practical system for recovering metal ions in a waste water by means of such a metal ion-treating agent, by having compound having a hydroquinone structure supported on a solid porous carrier as the redox reagent, connecting containers accommodating the reagent in series or in parallel, introducing a feed aqueous solution containing bivalent metal ions to be treated to sequentially contact and react it with the redox reagent supported on the solid carrier and accommodated in the containers, so that the bivalent metal ions are selectively reduced to monovalent metal ions and completely separated and captured on the solid porous carrier and if necessary, eluting after the reaction the monovalent metal ions separated, accumulated and captured on the solid porous carrier by supplying an eluent solution, and then supplying a reducing agent to the containers to restore the metal ion-treating agent to be effective again for the reduction reaction treatment system. The present invention has been accomplished on the basis of these discoveries.

Further, as a result of the extensive studies to solve the above problems, the present inventors have found that when an aqueous solution containing metal ions, particularly noble metal ions, is treated by the redox reagent i.e. the the agent having a compound having a hydroquinone structure adsorbed and fixed on a solid porous carrier, the noble metal ions are selectively reduced and adsorbed on the agent as zero valent metal, and the selectively is better than that obtainable by conventional resins. The present invention has been accomplished also on the basis of this discovery.

Thus, the present invention provides (1) an agent for treating metal ions in an aqueous solution, comprising a solid porous carrier and, supported thereon, an organic reagent (hereinafter referred to as a "redox reagent") which is capable of converting metal ions (inclusive of metal complex ions) contained in an aqueous solution to zero valent metal or monovalent metal ions by a redox reaction and which is capable of carrying out oxidation-reduction reversibly; (2) a process for producing the metal ion-treating agent, which comprises mixing a solid porous carrier to a solution comprising a quinone compound as a redox reagent of oxidized form and a solvent capable of dissolving the reagent, then gradually distilling off the solvent to have the reagent adsorbed on the solid porous carrier under saturated condition, if necessary exchanging the solvent or evaporating it to dryness, to have the reagent supported on the carrier, then washing off the redox reagent not supported on the solid porous carrier, with deionized water, followed by reduction treatment; (3) a process for producing the metal ion-treating agent, which comprises immersing a solid porous carrier in an aqueous solution of an alkali metal salt of a compound having a hydroquinone structure to have the compound adsorbed on the porous carrier, then separating the porous carrier, followed by washing treatment; (4) a method for treating metal ions in an aqueous solution, which comprises supplying an aqueous solution containing bivalent metal ions to a container packed with the metal ion-treating agent of the above item (1) to reduce and capture the metal ions on the metal ion-treating agent in the form of monovalent metal ions, supplying a solution capable of eluting monovalent metal ions to the metal ion-treating agent having the metal ions captured thereon, to elute the captured metal ions out of the treatment system, then subjecting the oxidized metal ion-treating agent to reduction treatment for restoration, and then repeating the treatment of bivalent metal ions by supplying the aqueous solution; (5) a method for treating metal ions in an aqueous solution, which comprises supplying an aqueous solution containing noble metal ions (inclusive of noble metal complex ions) to a container packed with the metal ion-treating agent of the above item (1), to reduce and capture on the metal ion-treating agent said noble metal ions in the form of zero valent metal, subjecting the metal ion-treating agent oxidized to such an extent that it can no longer substantially capture the noble metal ions, to reduction treatment for restoration, and repeating the treatment of noble metals by supplying the aqueous solution containing the noble metals; and (6) a method for treating metal ions in an aqueous solution, which comprises recovering silver thiosulfate complex ions from an aqueous solution containing them by capturing them in the form of silver metal on a metal ion-treating agent having an anthrahydroquinone compound supported on active carbon, wherein the pH of the aqueous solution is adjusted at a level of at least 7.

Now, the present invention will be described in detail with reference to the preferred embodiments.

As the redox reagent in the present invention, any compound may be employed so long as it is a compound which is capable of reducing metal ions to zero valent and which can be securely fixed on the porous carrier e.g. by adsorption. For example, it may be a compound having a hydroquinone structure. Such a compound includes a reduced form of a conventional quinone compound in a broad sense. Further, a compound obtained by reducing e.g. indigo may also be mentioned.

As the compound having a hydroquinone structure, a hydroquinone compound may be mentioned which is selected from the group consisting of hydroquinone (1,4-dihydroxybenzene), naphthohydroquinone (1,4-dihydroxynaphthalene) and anthrahydroquinone (9,10-dihydroxyanthracene), and hydrogenated compounds thereof and substituted products thereof.

As the substituents in the above mentioned substituted products of hydroquinone compounds, relatively hydrophobic substituents such as an alkyl group, an alkenyl group, an alkoxy group, a phenyl group, an alkylamino group and a halogen atom, may be mentioned. The carbon number of the alkyl group, the alkyl moiety in the alkoxy group, or the alkenyl group, is usually from 1 to 60, practically not more than 24, and the alkyl group may be linear or branched.

As the substituent of such a hydroquinone compound, it is possible to employ a substituent containing sulfonic acid group, a sulfonic acid amide group or a carboxyl group, so long as it presents no adverse effects against the purpose of the present invention. However, since the metal ion-treating agent of the present invention is used in an aqueous solution, it is generally preferred to employ a reducing compound having a hydrophobic substituent so that it will not elute into the aqueous solution.

The compound having such a substituent may, for example, be an alkylated hydroquinone compound such as 2-methylhydroquinone, 2-ethylhydroquinone, 2,3,5-trimethylhydroquinone, 2-methylnaphthohydroquinone, 2-ethylnaphthohydroquinone, 2-propylnaphthohydroquinone, 2-methylanthrahydroquinone, 2-ethylanthrahydroquinone, 2-amylanthrahydroquinone, 2-t-butylanthrahydroquinone or 2-(4-methyl-pentyl)anthrahydroquinone; an alkenylated hydroquinone compound such as 2-(4-methylpentenyl)anthrahydroquinone; an alkoxylated hydroquinone compound such as 1-methoxyanthrahydroquinone or 1,5-dimethoxyanthrahydroquinone; a phenyl-substituted hydroquinone compound such as 2-phenylhydroquinone; an alkyl amino-modified hydroquinone compound such as 2-N,N-dimethylaminoanthrahydroquinone; or a halogenated hydroquinone compound such as 2-chlorohydroquinone, 2,3-dichloronaphthohydroquinone, 1-chloroanthrahydroquinone or 2-chloroanthrahydroquinone. As a hydrogenated compound of a hydroquinone compound, 1,4-dihydro-9,10-dihydroxyanthracene, 1,2,3,4-tetrahydroanthrahydroquinone or 1,2,3,4,5,6,7,8-octahydroanthrahydroquinone may, for example, be mentioned.

Further, catechol, 4,4'-dihydroxybiphenyl (a reduced product of diphenoquinone) and a reducing compound corresponding to a polycyclic aromatic quinone such as 1,4-dihyroxyanthracene, 9,10-dihyroxyphenanthrene or a reduced product of anthoanthrone may also be mentioned. These compounds may be used alone or in combination as a mixture of a plurality of them.

In the present invention, the solid porous carrier may, for example, be silicon dioxide, active carbon, or a carbon product such as active carbon fibers, silicon dioxide or carbon particles such as active carbon modified to be hydrophobic, an aqueous emulsion product of e.g. polytetrafluoroethylene (Japanese Unexamined Patent Publication No. 92981/1978), organic synthetic polymer particles, a styrene divinylbenzene copolymer as a so-called organic synthetic adsorbent, or molded products thereof. For such a porous carrier to be preferably used, the pore size (diameter) is usually at least 10 Å, and the specific surface area per gram is usually from 50 to 1000 $m^2$ in the case of particles of silicon dioxide or a synthetic polymer, and at a level of about 1000 $m^2$ in the case of a carbon product. Active carbon may be used in any form such as a powder form, a pelletized spherical form or a pulverized carbon form.

In the present invention, the redox reagent is supported on the solid porous carrier to prepare the agent for treating metal ions in an aqueous solution. When the reducing compound as the redox reagent to be supported is relatively stable in the supporting step, like a hydroquinone compound, the redox reagent may be used as it is. However, if it is a compound unstable, e.g. readily oxidizable, in the step of supporting the redox reagent, like a naphthohydroquinone compound or an anthrahydroquinone compound, an oxide corresponding to such a redox reagent, such as a naphthoquinone compound or an anthraquinone compound, may be used as the material to be supported on the carrier.

In such a case, as oxides corresponding to e.g. hydroquinone, naphthohydroquinone and anthrahydroquinone, benzoquinone, naphthoquinone (1,4-naphthquinone) and anthraquinone (9,10-antrahquinone) as well as the hydrogenated compounds thereof and the quinone compounds having the above mentioned substituents, may be mentioned, respectively.

In the present invention, the process for producing the metal ion-treating agent is conducted usually as follows. For example, in a batch system method, the porous carrier is added to a solution having the reducing compound or its oxide dissolved in an organic solvent, usually at a temperature of at least room temperature, although the temperature varies depending upon the solvent and the type of the compound used; the reducing compound or its oxide as the redox reagent is impregnated and adsorbed on the porous carrier with stirring; and then the organic solvent is distilled off, followed by drying, to readily obtain a product having the reducing compound or its oxide supported thereon. Further, if necessary, a solvent may be added and impregnated to this dried product, and then deionized water is added thereto, followed by stirring, whereby the reducing compound or its oxide not adsorbed on the carrier, which floats, is removed, and the product having the reducing compound supported thereon is maintained as it is in a wetted state, to obtain an agent for treating metal ions in an aqueous solution. Further, the preparation may also be carried out in such a manner that the solid porous carrier wetted with a solvent is preliminarily packed in a column, and a solution having the reducing compound or its oxide dissolved therein, is passed therethrough for supporting, followed by washing. On the other hand, in a case where an oxide corresponding to the reducing compound is supported, the product having the oxide supported thereon is subjected to reduction treatment to prepare a similar metal ion-treating agent.

As a method for reducing the product having an oxide corresponding to the reducing compound supported thereon, it is possible to employ a conventional method for reducing a quinone compound to a hydroquinone compound. For example, an aqueous solution of a hydrosulfite such as sodium dithionite (sodium hydrosulfite) or potassium dithionite (potassium hydrosulfite) can suitable be employed. Further, depending upon the type of the quinone compound, a sulfite or a zinc-acid (or alkali) type reducing agent may be employed. In the case of reducing the quinone compound by sodium hydrosulfite, the reduction can be carried out by contacting at least the stoichiometrical amount of the sodium hydrosulfite solution to the carrier having the quinone compound supported thereon in a batch system or by passing the solution through a column packed with the carrier having the quinone compound supported thereon, under the condition of at most pH 10.

The reaction for reducing the quinone compound to the hydroquinone compound by sodium hydrosulfite may be represented by the following formula.

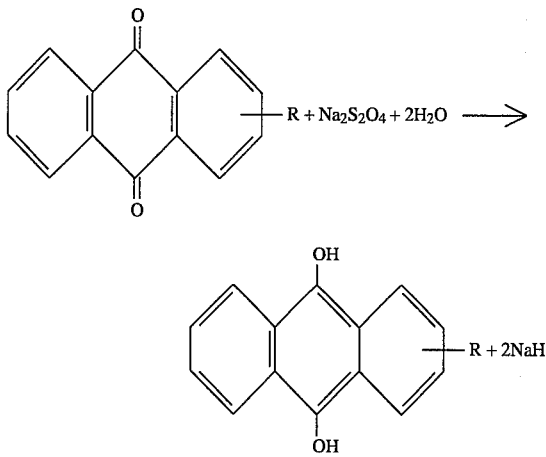

As the above mentioned organic solvent, any solvent may be employed so long as it is capable of dissolving a necessary amount of the reducing compound or its oxide. However, it is preferred to select a solvent in view of the solubility of the reducing compound or its oxide and the efficiency for supporting it on the carrier. As such an organic solvent, an alcohol such as methanol, ethanol, propanol or isopropanol, is usually employed.

The concentration of the reducing compound or its oxide in the solution is preferably lower than the solubility and close to the saturation concentration.

The amount of the reducing compound or its oxide to be supported, is not particularly limited and may vary depending upon the type of the solid porous carrier to be used. Further, such an amount is properly selected depending upon the purpose of use. However, usually the amount is from 0.01 to 2 mols/l of carrier, preferably from 0.02 to 1.2 mols/l of carrier.

If the supported amount is small, the cost tends to be high relative to the recovered metal. On the other hand, if it is too much, the amount of the compound which does not react with metal ions tends to increase, resulting in waste of raw material.

As a method for producing the metal ion-treating agent of the present invention, it is possible to employ, other than the above mentioned method of using an organic solvent for supporting the redox reagent on the carrier, a method which comprises adding the solid porous carrier to an aqueous solution of an alkali metal salt of the compound having a hydroquinone structure as the reducing compound of the redox reagent to have the compound having the hydroquinone structure adsorbed on the porous carrier and then separating the porous carrier, followed by washing treatment.

As this compound having a hydroquinone structure, any one of the above described compounds may be employed so long as it is a compound capable of forming a stable aqueous solution of the alkali metal salt. However, a compound having an anthracene structure which converts to other compound such as polycodensation products even in an alkali metal solution, can be advantageously used. For example, a dialkali metal salt of anthrahydroquinone, the above mentioned alkyl-substituted anthrahydroquinone, or 1,4-dihyro-9,10-dihydroxyanthracene (1,4-dihyroanthranhydroquyinone) or its alkyl-substituted compound, may be mentioned.

The alkali metal salt may, for example, be a sodium salt, a potassium salt or a lithium salt. However, usually, an inexpensive sodium salt is employed.

In particular, an aqueous solution of a disodium salt of 1,4-dihyro-9,10-dihyroxyanthracene compound can readily be prepared by reacting 1,4,4a,9-atetrahydroanthraquinone compound obtained by Diels Alder reaction of naphthoquinone with the corresponding 1,3-butadiene, with at least equivalent (at least 2 mol times to the quinone compound), preferably from 2 to 2.4 mol times, of an aqueous alkali metal hydroxide solution. Accordingly, it can be obtained industrially advantageously. The concentration of the aqueous solution of the alkali metal salt of the compound having a hydroquinone structure to be used in the process of the present invention (the concentration is represented by weight % as calculated as the quinone compound such as anthraquinone) is usually from 1 to 23 wt %, preferably from 2 to 22 wt %. The temperature for the adsorption treatment may usually be room temperature, and the time for adsorption is usually from 30 minutes to 5 hours, preferably 1 to 4 hours. Such a compound having a hydroquinone structure is used usually in an amount of at most 3 mols, preferably at most 2.5 mols and usually at least 0.1 mol, preferably at least 0.3 mol, although the amount varies depending upon the type of the solid porous carrier. As the amount increases, the ratio of the non-adsorbed amount to the adsorbed amount increases, thus leading to waste of the compound. On the other hand, if the amount is too small, the adsorbed amount will be relatively small, thus leading to poor efficiency in the metal ion treatment.

The adsorption treatment can be conducted by a batch method without oxygen wherein the container containing the porous carrier and the aqueous solution of the alkali metal salt of the compound having a hydroquinone structure, is slowly rotated or left to stand for adsorption, or by a continuous method wherein the porous carrier is preliminary packed into e.g. a column, and an aqueous solution of a dialkali metal salt of the compound having a hydroquinone structure is circulated for adsorption under an immersed condition.

As the solid porous carrier to be used in this method, the above mentioned carrier may be mentioned, but a carbonaceous carrier such as active carbon is particularly preferred since it is inexpensive and easy to handle and can support the reagent at a high supporting rate.

The compound having a hydroquinone structure as the redox reagent is usually a very weak acid. Accordingly, simply by washing the carrier having the alkali metal salt of the compound supported thereon with water, the salt can be hydrolyzed, and the alkali metal ions can be substituted by hydrogen ions. In order to minimize the amount of washing water or to ensure the substitution by hydrogen ions in the washing treatment, it is effective to conduct the treatment by an aqueous acid solution. As the acid to be used for this washing treatment by an aqueous acid solution, any organic or inorganic acid may be employed so long as it is an acid capable of freeing the alkali metal salt. For example, as the inorganic acid, sulfuric acid or hydrochloric acid may be mentioned, and as the organic acid, a carboxylic acid such as acetic acid, or a sulfonic acid such as naphthalene sulfonic acid may be mentioned.

This acid may be used in such an amount whereby the alkali metal ions in the carrier are sufficiently substituted by hydrogen ions. The amount is usually at least equivalent and at most 20 equivalent of the adsorbed compound, and its concentration is usually from 0.1 to 20 wt % in the aqueous solution.

With respect to this washing treatment, without preliminarily conducting such washing treatment, washing treatment and metal ion treatment may be conducted simultaneously by the treatment of a neutral to acidic aqueous solution of metal ions to be treated. However, it is preferred to conduct the washing treatment preliminary from the viewpoint of the safety in the storage and transportation, since the compound having a hydroquinone structure, particularly the alkali metal salt of the anthrahydroquinone, is readily oxidized and is likely to generate heat or fire when it is in contact with an oxidizing agent such as air.

This method is carried out usually as follows. For example, a predetermined amount of particulate active carbon is put into a container, deaerated under reduced pressure and thoroughly substituted by nitrogen, and then a predetermined amount of an aqueous solution having a predetermined concentration of an alkali metal salt of the compound having a hydroquinone structure i.e. a disodium salt of 1,4-dihydro-9,10-dihyroxyanthrancene is added to the porous carrier under a nitrogen atmosphere, followed by adsorption under reduced pressure for a predetermined period of time. This mixture is subjected to a separation apparatus such as a centrifugal separator under an nitrogen atmosphere to separate the carrier. The separated carrier is washed with water such as deoxidized and deionized water or washed with dilute acid such as from 5 to 10 wt % sulfuric acid. Then, the obtained carrier having the compound having a hydroquinone structure supported thereon is stored in thoroughly deoxidized and deionized water. The supported amount of the resulting metal ion-treating agent varies depending upon the type of the compound having a hydroquinone structure, the concentration of the aqueous solution of the salt thereof and the type of the solid porous carrier. However, for example, in the case where a disodium salt of 1,4-dihydro-9,10-dihyroxyanthracene and particulate active carbon are used, the supported amount is usually from about 0.3 to 0.8 mol/l.carrier. The metal ion-treating agent composed of 1,4-dihyro-9,10-dihyroxyanthracene/active carbon thus obtained shows a metal ion capturing efficiency per mol of from 2 to 5 times as compared with other compounds having hydroquinone structures, when it is used for the first time for the treatment of e.g. silver thiosulfate complex ions.

In the present invention, the metal ion-treating agent having the redox reagent supported thereon is capable of selectively reducing bivalent metal ions having a higher equilibrium oxidation-reduction potential (here, an equilibrium oxidation-reduction potential means an oxidation-reduction potential at the time when the oxidized form and the corresponding reduced form are in an equilibrium state under the operation condition), such as cupric ions or mercuric ions, converting them to monovalent metal ions such as cuprous ions or mercurous ions and quantitatively separating, accumulating and capturing the monovalent metal ions from the aqueous solution onto the solid porous carrier, so that the treated solution contains no substantial metal ions.

The monovalent cuprous ions are soluble in hydrochloric acid or in aqueous ammonia and therefore can readily be eluted from the solid porous carrier on which they are accumulated and captured. The eluted cuprous ions are substantially colorless. However, if this eluted aqueous solution is diluted appropriately and oxidized with air, the cuprous ions will be oxidized to cupric ions to show a blue color specific to cupric ions.

With the redox reagent supported on the solid porous carrier i.e. the metal ion-treating agent of the present invention, for example, bivalent copper ions are selectively reduced, separated and captured in the form of monovalent copper ions. Whereas, in the above mentioned separation method disclosed in U.S. Pat. No. 3,820,979 wherein a solvent solution is employed, the bivalent copper ions are reduced to copper metal, as is different from the present invention. Thus, in the present invention, the captured monovalent copper ions can readily be eluted and recovered as the case requires.

In the present invention, the metal ions to be captured in the form of monovalent metal ions may be any metal ions so long as they can be captured in the form of monovalent metal ions by the metal ion-treating agent of the present invention. Usually, however, they may, for example, be bivalent copper ions or mercury ions. The corresponding anions are not particularly limited so long as they are capable of forming a water-soluble salt as a bivalent metal salt and capable of being captured by the metal ion-treating agent. Such a salt may, for example, be a copper salt of an inorganic acid, such as cupric chloride, cupric bromide or cupric sulfate; a copper salt of an organic acid such as cupric acetate; a copper complex salt such as copper acetylacetonate; a mercury salt of an inorganic acid such as mercuric chloride, mercuric bromide or mercuric sulfate; or a mercury salt of an organic acid, such as mercuric acetate.

The treatment with the metal ion-treating agent is conducted usually under a condition such that the pH is at a level where capturing the metal ions is carried out in the relation of an equilibrium oxidation-reduction potential. The pH is usually selected to be at a level of from 0 to 8. The metal ion concentration in the aqueous solution is usually from 0.01 to 10,000 ppm, preferably from 0.1 to 1,000 ppm, and the treating temperature is usually from 10° to 70° C. Usually, the treatment is carried out at a room temperature.

The monovalent metal ions captured by the metal ion-treating agent can be eluted and recovered by means of a solution which is capable of dissolving and eluting the monovalent metal ions. Otherwise, it is also possible to incinerate the metal ion-treating agent having the metal ions captured thereon, by a known incineration method and recover them in the form of a metal, an oxide or a salt.

In particular, cuprous ions are soluble in hydrochloric acid or in aqueous ammonia although they are insoluble in the cuprous salt such as cuprous chloride or cuprous bromide. Accordingly, the cuprous ions can easily recovered by using such an aqueous solution as an eluting solution. Such an eluting solution is selected to have a concentration capable of dissolving cuprous ions. Usually, however, concentrated hydrochloric acid or concentrated aqueous ammonia is employed, and it may be suitably diluted, as the case requires. The elution is usually conducted at a room temperature.

In the accompanying drawings:

FIG. 2 is a graph showing the relation between the pH of an aqueous solution containing silver thiosulfate complex ions before the treatment and the amount of the captured silver ions in a case where the aqueous solution containing silver thiosulfate complex ions is treated by a metal ion-treating agent having 1,4-dihyro-9,10-dihydroxyanthracene supported on active carbon.

Figure 1:
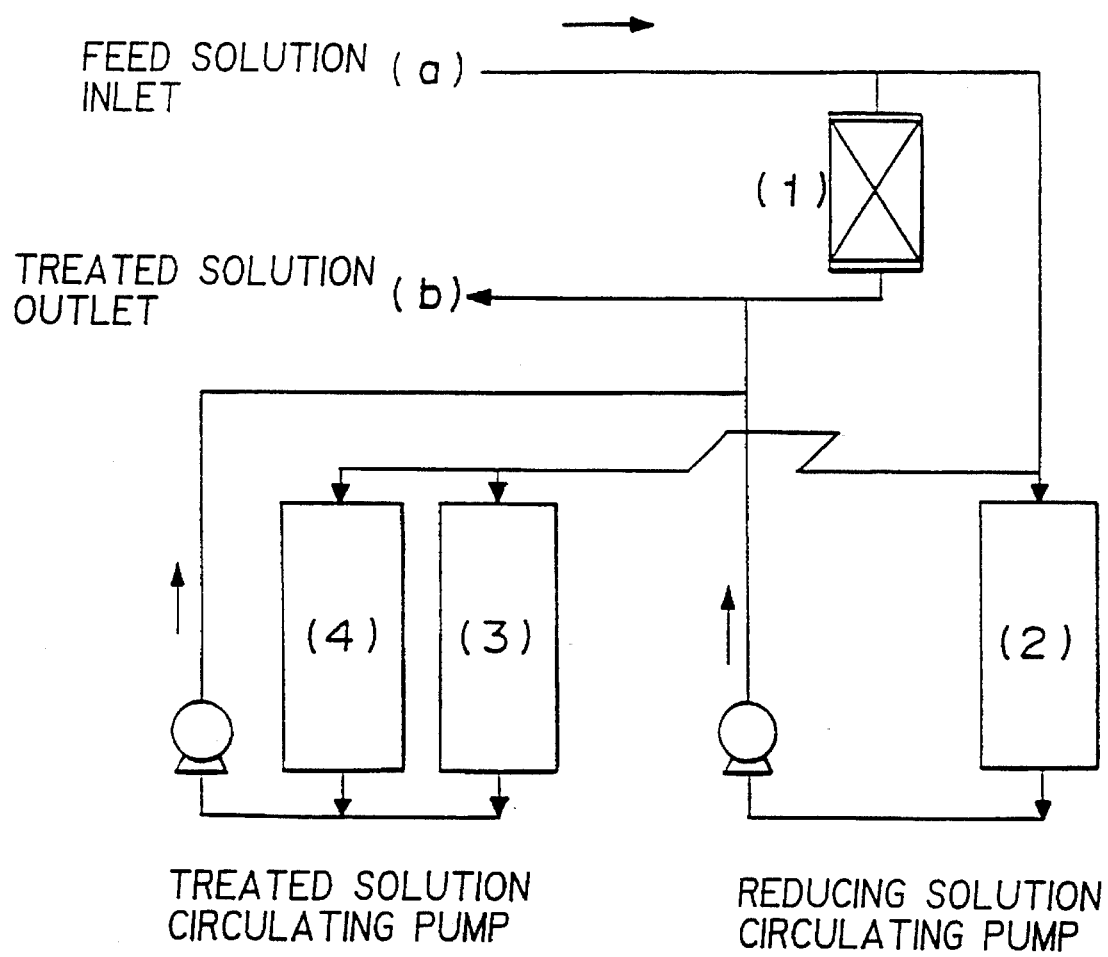
FIG. 1 illustrates a system for treating metal ions in a waste water comprising a series of operations conducted or repeated in the order of "standard metal ion-treatment", if necessary "metal ion removal treatment of the metal ion-treatment container" and "reduction or re-reduction treatment of the metal ion-treating agent in the metal ion treatment container".

When a system is constituted so that containers accommodating the metal ion-treating agent are connected in series or in parallel, bivalent metal ions supplied to the system will be contacted with the redox reagent supported on the solid porous carrier accommodated in the containers, for example, sequentially from the upper layer in the case of the downflow system, whereby the bivalent metal ions will be reduced to monovalent metal ions, which will then be quantitatively separated, accumulated and captured on the solid porous carrier. Thus, it is possible to control the amount of leakage of the bivalent metal ions, and since no further reduction takes place, the aqueous solution of metal ions can be treated very efficiently.

Now, a system constituting the present invention will be specifically described with reference to FIG. 1.

Standard preparation of a metal ion-treating agent

A redox reagent having a predetermined concentration corresponding to the amount to be supported and isopropanol solvent to dissolve the reagent to form a saturated solution, are prepared. Then, a predetermined amount of the solid porous carrier is mixed thereto, and the mixture is maintained at a constant temperature to firstly dissolve the crystals of the reagent, followed by adsorption operation. Then, while rotating under reduced pressure, the solvent is gradually distilled off, whereby the reagent is continuously adsorbed on the solid porous carrier in a saturated state. If necessary, solvent exchange is conducted. Thus, the reagent is supported on the solid porous carrier, and the redox reagent not supported, is washed off with deionized water. The metal ion-treating agent thus prepared is maintained in a wetted state.

When the metal ion-treating agent for reduction treatment thus prepared and maintained in a wetted state, is used as an agent for treating metal ions in a waste water, a predetermined amount thereof is accommodated in the container (1) of the system for treating metal ions, whereby preparation of the agent for treating metal ions in a waste water is completed.

Reduction and re-reduction treatment of the metal ion-treating agent in the metal ion treatment container The metal ion treatment container (1) thus prepared is subjected to reduction treatment for conversion to a hydroquinone type by supplying an aqueous reducing agent solution prepared in a reduction and re-reduction solution tank (2) constituting the system for treating metal ions. After substituting the hold up in the container by treated water, a feed aqueous solution to be treated for reduction, will be introduced.

Standard metal ion treatment

The metal ion treatment container (1) is preliminarily filled with water treated by reduction treatment, and then the feed water inlet line (a) of the system for treating metal ions is switched to the metal ion treatment container (1) and adjusted to a predetermined supply rate, whereupon the metal ion treatment is initiated. At the outlet line (b) for treated water, a metal ion detector is provided, so that when it detects a prescribed value at the outlet, such as a predetermined concentration of metal ions, the feed water inlet line (a) will be switched to a reserve metal ion treatment container (1).

Metal ion removal treatment of the metal ion treatment container

When the metal ion concentration at the outlet of treated water exceeds a prescribed value, the feed water inlet line (a) and the treated water outlet line (b) will be switched to the reserve metal ion treatment container (1). In a case where repeated operation is required, a metal ion removal solution prepared in a metal ion removal treatment solution tank (3) constituting the system is supplied to the metal ion treatment container (1) in which metal ions reduced and captured are separated and accumulated, to dissolve the metal ions accumulated and captured on the surface of the solid porous carrier. Then, the hold up in the container is discharged into the metal ion removal treatment solution tank (3) and substituted by washing water prepared in a washing water tank (4).

The operation is carried out in the order of "the standard metal ion treatment" and "the reduction or re-reduction treatment of the standard metal ion treatment container". If necessary, such an operation is repeated via "the metal ion removal treatment of the standard metal ion treatment container".

Further, when the metal ion-treating agent of the present invention is used, it is possible to convert metal ions contained in an aqueous solution to zero valent metal by a redox reaction and capture it on the treating agent for recovery.

The metal ions to be treated by the metal ion-treating agent in the present invention, are limited to metal ions having a higher equilibrium oxidation-reduction potential of metal ion-metal than the equilibrium oxidation-reduction potential of the reducing compound as the redox reagent supported on the solid porous carrier. In the present invention, such metal ions may be metal ions forming a complex. Namely, such metal ions correspond to metal ions which can be reduced to zero valent metal by the reducing compound supported on the porous carrier. For example, when a hydroquinone compound is used as the reducing compound, the metal corresponding to such metal ions may be a noble metal such as gold, silver or a platinum group element, and the platinum group element may, for example, be ruthenium, rhodium, palladium, osmium, iridium or platinum. Particularly preferred is gold, silver, platinum, palladium, rhodium or ruthenium.

As complex ions of metal, silver thiosulfate complex ions ($[Ag(S_2O_3)_2]^{3-}$ or $[Ag(S_2O_3)_3]^{5-}$), tetrachloroauric acid ions or hexachloroplatinic acid ions may, for example, be mentioned.

As a method for treating an aqueous solution containing metal ions in the present invention, a batch system treating method may be employed in which the metal ion-treating agent prepared as described above, is added in an amount of at least equivalent to reduce metal ions in an aqueous solution containing the metal ions, followed by stirring, and then the redox reagent supporting carrier is collected by filtration or decantation. However, it is common to employ a method wherein the above mentioned redox reagent-supporting carrier is packed into a column (tower), and an aqueous solution containing metal ions is passed therethrough. The method of passing the aqueous solution through the column is not particularly limited and can be conducted by a usual method. A method of an upward countercurrent system or a downward countercurrent system, may suitable employed. The pH of the solution to be treated is influenced also by the co-existing anions, but it is not particularly limited so long as the metal ions can be present in a stable condition in the aqueous solution. However, it is usual to employ a pH within a range of from 0 to 9, preferably from 0 to 8. So long as the desired metal ions will not precipitate, anions of e.g. an inorganic acid or an organic acid may be present in the aqueous solution. The concentration of metal ions in the aqueous solution is not particularly limited so long as they are dissolved. However, the concentration is usually from 0.01 to 10,000 ppm, preferably from 0.1 to 1,000 ppm. The treating temperature is usually from 10° to 70° C., and the treatment is conducted normally at room temperature.

Further, in the present invention, it is possible to employ a method wherein at least two types of metal ion-treating agents having reducing compounds with different equilibrium oxidation-reduction potentials supported on solid porous carriers, are used to treat an aqueous solution containing at least noble metal ions to be recovered, to selectively separate the noble metal ions from other metal ions.

Namely, this is a method for treating metal ions in an aqueous solution wherein a plurality of layers packed with metal ion-treating agents having at least two types of compounds having hydroquinone structures with different oxidation-reduction potentials supported on the respective solid porous carriers, are arranged in series, and the aqueous solution containing at least noble metal ions are contacted to such packed layers to selectively capture the metal ions in the form of zero valent metal by utilizing the difference in the reducing power. Such a method can be carried out by an apparatus wherein the plurality of the packed layers of metal ion-treating agents may, for example, form upper and lower two layers in a single container or column, or by an apparatus wherein separate containers are arranged in series.

In this case, the combination of the reducing compound and the metal ions can be determined by the respective equilibrium oxidation-reduction potentials. For example, when the reducing compound is hydroquinone, it will capture noble metal ions or palladium ions as the metal ions, but it will not capture copper ions. When the reducing compound is 2-ethylantrhahydroquinone, it will capture noble ions and copper ions as the metal ions. Accordingly, by firstly using a metal ion-treating agent employing the former reducing compound and then using a metal ion-treating agent employing the latter reducing compound, it is possible to selectively separate and capture noble metal ions and copper ions. By this method, it will be possible to recover a plurality of metal ions without inclusions.

This method can be carried out under the same conditions as for the above mentioned treating method employing a single metal ion-treating agent except that a plurality of columns are used.

Further, the present inventors have found unexpectedly that when a metal ion-treating agent having the reducing power lost by the treatment of an aqueous solution containing noble metal ions, is reduced again with a sodium hydrosulfite solution and then reused for the treatment of the aqueous solution containing noble metal ions, it is possible to reduce, adsorb and capture noble metal ions repeatedly for many times, although there are some differences depending upon the type of the supported redox reagent.

The method for treating the aqueous solution of metal ions and the method for reducing the metal ion-treating agent converted to the oxidized form (quinone form) by break through, can be conducted in the same manner as the above mentioned method.

In this case, as is different from the case where copper ions or mercury ions are captured in the form of monovalent ions by the metal ion-treating agent, no operation for eluting the captured metal ions will be conducted, and the metal ion-treating agent having the reducing power lost, will be subjected to reduction treatment as described above, if necessary, after washing with e.g. deionized water, and then can be repeatedly used for treatment of an aqueous solution containing metal ions.

In a case where a metal ion-treating agent having an anthrahydroquinone compound supported on active carbon, is used so that from an aqueous solution containing silver thiosulfate ions, such ions are captured as silver metal on the metal ion-treating agent and recovered, the pH of the aqueous solution is adjusted at least 7, preferably from 8 to 12, more preferably from 8 to 11, whereby as shown in FIG. 2, the amount of captured silver per unit metal ion-treating agent will be increased. The effect of pH is remarkable when the concentration is high. Accordingly, the concentration is at least 10 ppm, preferably at least 20 ppm as silver. Generally, the amount of captured silver will be maximum at a pH of at least about 8. From the economical viewpoint, the addition of alkali compounds, such as sodium hydroxide should not be so much, and the pH is preferably at most 11, and if the pH exceeds 12, the supported redox reagent tends to elute, such being undesirable.

With respect to the treating agent having finally lost the ability for restoration and having a metal captured thereon, by using a carrier which can be incinerated such as an organic synthetic adsorbent or active carbon, it is possible to readily recover an expensive metal such as noble metal by incinerating the treating agent having such metal captured thereon. This incineration method is not particularly limited, and a method of any type may be used so long as the noble metal can be easily recovered from the incinerated residue, such as a method of using a rotary incineration furnace such as a rotary kiln or an incineration furnace of crucible type.

In a case where the captured metal can be dissolved and recovered with an acid such as nitric acid, it is possible to employ such a recovery method.

The present invention is applicable to an aqueous solution containing metal ions, which includes metal ion aqueous solutions discharged from various industries. It is applicable particularly advantageously to a waste water containing a noble metal from an industry handling such a noble metal. For example, a waste water containing gold or silver ions or complex ions discharged from a plant for treating electronic parts, a waste water containing ions or complex ions of e.g. palladium, ruthenium, rhodium or platinum, discharged from a plant for producing a catalyst, or a waste water containing silver thiosulfate ions, discharged from a fixing solution for photographs, may be mentioned.

The immobilizing function of the metal ion-treating agent having the redox reagent supported on the solid porous carrier in the present invention, is basically adsorption. When such a treating agent is used for treatment of the above mentioned aqueous solution containing metal ions, particularly noble metal ions, even when the noble metal ions are in the form of a complex, such noble metal ions will be reduced to zero valent metal on the carrier, and thereby selectively captured, whereby there will be no substantial noble metal ions detected in the treated water. Further, in a case where the carrier of the treating agent is a synthetic adsorbent, the treating agent having e.g. silver captured thereon exhibits a so-called metallic gloss specific to the metal. When such a treating agent having a noble metal captured thereon was analyzed by a power X-ray diffraction method, it was confirmed that it was captured as a metal.

The mechanism whereby metal ions will be captured as a metal on the metal ion-treating agent, is not yet certainly analyzed. However, judging from the phenomena, it is considered that when the metal ions are in contact with the metal ion-treating agent, they will be reduced by the hydroquinone compound supported on the metal ion-treating agent to form nuclei of the metal, and through such nuclei, exchange of electrons takes place to let the metal grow and form a metal coating film on the metal ion-treating agent.

Also at the time of reduction for restoration, it is considered that exchange of electrons takes place through the metal coating film formed on the metal ion-treating agent, to reduce the supported quinone compound to a hydroquinone compound, whereupon metal ions can again be reduced and captured on the metal-ion-treating agent.

Now, the present invention will be described in further detail with reference to Examples. However, it should be understood that the present invention is by no means restricted to such specific Examples.

EXAMPLE 1

Preparation of a treating agent for reduction reaction

As a solid porous carrier, 100 ml of a particulate synthetic polymer adsorbent ("SP207" tradename, manufactured by Mitsubishi Kasei Corporation) wetted with methanol, was packed in a glass container (diameter:22 mm, height:300 mm), and a solution having 3 g of 2-(4 -methyl-pentenyl)-9,10-anthraquinone (molecular weight:290) as a redox reagent dissolved in 1 l of a methanol solvent, was passed through the container at a space velocity (SV) of 2 $hr^{-1}$, to have the redox reagent dissolved in methanol, adsorbed on the solid porous carrier in the container. Then, as a solvent exchange operation, the methanol solution having the redox reagent dissolved therein remaining in the container was substituted by a solvent solution comprising 50 vol % of methanol and 50 vol % of deionized water, and further the solvent solution used for the solvent exchange, remaining in the container, was substituted by deionized water.

Here, the amount of the redox reagent having adsorbed on the solid porous carrier, was measured and found to be 1.98 g, which corresponds to 0.068 mol as calculated as the concentration per l of the solid porous carrier.

Reduction and re-reduction treatment of the standard treatment container

The redox reagent supported on the solid porous carrier in the container was subjected to reduction treatment with 50 ml of a 5% sodium hydrosulfite aqueous solution at a space velocity (SV) of 3 $hr^{-1}$. Then, it was washed with 200 ml of deionized water bubbled with nitrogen.

Standard reduction treatment

As feed water, a waste water (pH 4.7) containing bivalent copper ions (2,000 mg per l, as calculated as cupric chloride), was passed through the container subjected to reduction treatment as described above, at a space velocity (SV) of 3 $hr^{-1}$, whereby copper ion concentration at the outlet line of the treated water was not higher than 0.01 mg per l, even after passing 450 ml of the waste water.

A waste water containing mercury ions (1,000 mg per l, as calculated as mercury bromide) was passed through the container subjected to the reduction treatment as described above, likewise at a space velocity (SV) of 3 $hr^{-1}$, whereby the mercury ion concentration at the outlet line of the treated water was not higher than 0.01 mg per l even after passing 1,500 ml of the waste water. The results are as shown in Table 1.

TABLE 1

| Metal in treated waste water | Amount of treated feed water (one pass) | Treating time (one pass) | Metal treatment rate* |
|---|---|---|---|
| Cupric chloride | 450 ml | 90 minutes | 99.99% |
| Mercuric bromide | 1,500 ml | 300 minutes | 99.99% |

*(Metal in feed water - metal in treated water)/metal in feed water × 100

EXAMPLE 2

In order to repeatedly use the metal ion-treating agent prepared in a glass container (diameter:22 mm, height:300 mm) in the same manner as in Example 1 as the agent for treating metal ions in a waste water, reduction treatment and washing treatment were carried out. Then, as the feed water, a waste water containing bivalent copper ions (2,000 mg per l, as calculated as cupric chloride, pH 4.7) was passed therethrough at a space velocity (SV) of 3 $hr^{-1}$, and when the copper ion concentration at the outlet line of treated water exceeded a prescribed concentration (e.g. 2 mg of copper per l, as the waste water standard), supply of the feed water was stopped, and metal ion removal treatment was conducted.

Metal ion removal treatment of the standard treatment container

By passing 100 ml of concentrated hydrochloric acid (SV:2 $hr^{-1}$) and then washing with 300 ml of deionized water, monovalent copper ions accumulated and captured on the solid porous carrier were eluted. Then, an operation for substitution with deionized water was carried, and the total amount of eluted copper was quantitatively analyzed by an ICP emission spectrometry (Inductively Coupled Plasma Emission Spectrometry).

Reduction and re-reduction treatment of the standard treatment container

The redox reagent supported on the solid porous carrier in the container, was subjected to re-reduction treatment with 50 ml of a 5% sodium hydrosulfite aqueous solution (SV:3 $hr^{-1}$), and then washed with 200 ml of deionized water bubbled with nitrogen. Then, it was used for repeated reduction treatment of the feed water. As a result, no remarkable decrease in the reduction treating ability was observed even after repeating the operation ten times. The results are as shown in Table 2.

TABLE 2

| Number of times of repeated operations | Amount of feed water per operation | Treating time per operation | Copper treatment rate* |
|---|---|---|---|
| once | 500 ml | 100 min | 99.9% |
| twice | 500 ml | 100 min | 99.9% |
| 3 times | 500 ml | 100 min | 99.9% |
| 4 times | 450 ml | 90 min | 99.9% |
| 5 times | 450 ml | 90 min | 99.9% |
| 6 times | 450 ml | 90 min | 99.9% |

TABLE 2-continued

| Number of times of repeated operations | Amount of feed water per operation | Treating time per operation | Copper treatment rate* |
|---|---|---|---|
| 7 times | 450 ml | 90 min | 99.9% |
| 8 times | 450 ml | 90 min | 99.9% |
| 9 times | 450 ml | 90 min | 99.9% |
| 10 times | 450 ml | 90 min | 99.9% |

*(Copper in feed water - copper in treated water)/copper in feed water × 100

TABLE 3

| Total amount of treated feed water | Total treatment time | Copper treating rate* |
|---|---|---|
| 20 l | 0.7 hours | 100.0% |
| 40 l | 1.4 hours | 100.0% |
| 60 l | 2.2 hours | 100.0% |
| 80 l | 2.9 hours | 100.0% |
| 100 l | 3.6 hours | 99.8% |
| 120 l | 4.3 hours | 81.8% |

*(Copper in feed water - copper in treaded water)/copper in feed water × 100

EXAMPLE 3

Preparation of a treating agent for reduction reaction

Into a container of a rotary evaporator, 2300 g of a particulate synthetic polymer adsorbent (same as in Example 1) wetted with methanol was introduced as a solid porous carrier. Then, 354 g of ethylanthraquinone (molecular weight: 236) as a redox reagent and 2.5 l of isopropanol as a solvent were added thereto, and the mixture was maintained at a hot bath temperature of 80° C. under rotation until the redox reagent was dissolved and disappeared, whereby the redox reagent dissolved in isopropanol was adsorbed on the adsorbent in the container. Then, the solvent was gradually distilled off under a reduced pressure of 560 mmHg under rotation and heating at the same temperature and evaporated to dryness until the particle surface of the solid porous carrier became dry. The dried solid porous carrier particles were put into deionized water while they were still hot, and the floating redox reagent which was not supported on the solid porous carrier particles was washed off with deionized water with stirring, for refining, and the treating agent was maintained in a wetted state.

Here, the amount of the redox reagent adsorbed and supported on the solid porous carrier was measured and found to be 0.4 mol as calculated as the concentration per l of the solid porous carrier.

Reduction and re-reduction treatment of the standard treatment container 3.7 l of the solid porous carrier particles having the redox reagent supported thereon by the above operation were put into a reduction treatment container (1) having a diameter of 130 mm and a height of 1,000 mm to use them as an agent for treating metal ions in a waste water, and the container was set in the reduction treatment system. Then, reduction treatment was carried out with 6 l of a 5% sodium hydrosulfite solution (SV:2 hr$^{-1}$), and then washing was conducted with 6 l of deionized water bubbled with a nitrogen.

Standard reduction treatment

As the feed water, a waste water containing bivalent copper ions (2,000 mg per l, as calculated as cupric chloride, pH 4.7) was passed therethrough at a space velocity (SV) of 7.5 hr$^{-1}$.

The copper ion concentration at the outlet line of the treated water was measured, and the treatment rate of copper relative to the amount of total copper in the treated feed water, was calculated. The results are as shown in Table 3.

Metal ion removal treatment

The hold up in the reduction treatment container (1) was withdrawn, and the feed solution inlet line (a) and the treated solution outlet line (b) were switched to the metal ion removal treatment step. Then, 3 l of concentrated hydrochloric acid prepared in the metal ion removal treatment solution tank (3) was circulated at a space velocity (SV) of 2 hr$^{-1}$, and then 8 l of concentrated hydrochloric acid was passed therethrough at a space velocity (SV) of 0.75 hr$^{-1}$, whereby monovalent copper ions accumulated and captured on the metal ion-treating agent, were eluted. The concentration of copper ions in concentrated hydrochloric acid obtained by the concentrated hydrochloric acid circulation treatment, was about 10,000 mg/l. Cuprous chloride contained in the total metal ion removal treatment solution was about 110 g as copper, and substantially all the amount of captured copper, was recovered. Then, the hold up in the container was discharged to the solution tank (3), and 10 l of washing water prepared in the washing water tank (4) was passed therethrough at a space velocity (SV) of 0.75 hr$^{-1}$ for substitution by washing water.

EXAMPLE 4

In order to use the treating agent for reduction reaction prepared in the same manner as in Example 3 as an agent for treating metal ions in a waste water, 3.7 l of solid porous carrier particles having 0.4 mol of the redox reagent supported per l of the solid porous carrier, was put into a reduction treatment container (1) having a diameter of 130 mm and a height of 1,000 mm, and the container was set in the reduction treatment system. Then, reduction treatment was carried out with 6 l of a 5% sodium hydrosulfite solution prepared in a reduction solution tank (2) (SV:2 hr$^{-1}$), and washing was carried out with 6 l of deionized water flushed with nitrogen.

Standard reduction treatment

As the feed water, a waste water (pH 5.7) containing bivalent copper ions (150 mg per l, as calculated as cupric chloride), a large amount of ammonium chloride and urea derivatives, was passed therethrough at a space velocity (SV) of 3 hr$^{-1}$.

The copper ion concentration at the outlet line of treated water, was measured, and the copper treatment rate relative to the amount of total copper in the treated feed water was calculated. The results are as shown in Table 4.

TABLE 4

| Total amount of treated feed water | Total treatment time | Copper treating rate* |
|---|---|---|
| 100 l | 9 hours | 100.0% |
| 200 l | 18 hours | 100.0% |
| 300 l | 27 hours | 100.0% |
| 400 l | 36 hours | 100.0% |
| 500 l | 45 hours | 98.4% |
| 600 l | 54 hours | 88.0% |

*(Copper in feed water - copper in treaded water)/copper in feed water × 100

EXAMPLE 5

(1) Preparation of a metal ion-treating agent having 2-ethylanthrahydroquinone supported on a solid porous carrier Supporting of 2-ethylanthraquinone Into a 10 l egg plant type flask, 2.5 l of a synthetic adsorbent [styrene-divinylbenzene copolymer, specific surface area: 600 m$^2$, most frequent pore radius:100 Å, pore volume nitrogen:1.08 ml/g, particle size:0.4 to 0.6 mm] ("Sepabeads SP207", tradename, manufactured by Mitsubishi Kasei Corporation) wetted with methanol, was introduced. Then, 354 g of 2-ethylanthraquinone (molecular weight:236) as an oxide of a reducing compound and 2.5 l of isopropanol as a solvent, were added thereto. Then, the flask was mounted on a rotary evaporator and heated on a hot bath at 80° C. until 2-ethylanthraquinone was dissolved and no longer visually observed, and dissolved 2-ethylanthraquinone was adsorbed by the synthetic adsorbent whale rotating the evaporator at 80° C. Further, the solvent was distilled off under a reduced pressure of 560 mmHg under heating at the same temperature, while maintaining the saturated solution state to prevent precipitation of crystals, so that 2-ethylanthraquinone was adsorbed on the synthetic adsorbent, and the solvent was evaporated to dryness until finally the particle surface of the synthetic adsorbent became a dried state.

This dried state synthetic adsorbent was put into 2 l of cool methanol and thoroughly impregnated. Then, 10 l of deionized water was added thereto, and the mixture was stirred, whereupon floating 2-ethylanthraquinone not adsorbed on the synthetic adsorbent was removed. Further, the same operation of washing with deionized water was repeated until non-adsorbed 2-ethylanthraquinone no longer floated. The obtained supporting product was maintained in a wetted state.

The amount of 2-ethylanthraquinone adsorbed in the supporting product was measured, whereby the adsorbed amount was 0.47 mol per l of the synthetic adsorbent.

Preparing of a metal ion-treating agent by reducing the 2-ethylanthraquinone-supporting product 10 ml of the 2-ethylanthraquinone-supporting product obtained by the above operation, was packed into a glass column (diameter:12 mm, height:150 mm), and then 50 ml of a 4 wt % sodium hydrosulfite aqueous solution was passed therethrough at room temperature at a space velocity (SV) of 4 hr$^{-1}$ under a nitrogen atmosphere to conduct reduction treatment. Then, 50 ml of deionized water was passed therethrough for washing, to obtain a metal ion-treating agent (2-ethylanthrahydroquinone-supporting product) packed in the column.

(2) Treatment of an aqueous solution containing metal ions by means of the metal ion-treating agent Through the column packed with the treating agent prepared in the above step (1) in this Example, 100 ml of a model aqueous solution (pH 1.3) prepared as described hereinafter and containing, as metal ions, ions (10 mg/l each as calculated as metal ions) of sodium, potassium, iron (trivalent), nickel (bivalent), tetrachloroauric acid (trivalent as gold), palladium (bivalent) and hexachloroplatinic acid (tetravalent as platinum), was passed at room temperature at a space velocity (SV) of 2 hr$^{-1}$. The concentrations of the respective metal ions in the treated water passed through the column were measured, and the results are as shown in Table 5.

It is evident from these results that noble metal ions were selectively captured, and their recovery rate was high.

Preparation of the model aqueous solution 5 ml each of aqueous solutions of various metal ions i.e. sodium chloride in 0.02M hydrochloric acid (1000 mg/l as sodium ions), potassium chloride in 0.02N hydrochloric acid (1000 mg/l as potassium ions), nickel chloride in 0.1N hydrochloric acid (1000 mg/l as bivalent ions of nickel), ferric chloride in 0.1N hydrochloric acid (1000 mg/l as trivalent ions of iron), palladium chloride in 1N hydrochloric acid (1000 mg/l as bivalent ions of palladium), tetrachloroauric acid in 1N hydrochloric acid (1000 mg/l as trivalent ions of gold) and hexachloroplatinic acid in 1N hydrochloric acid (1000 mg/l as tetravalent ions of platinum) as standard solutions for atomic absorptiometry manufactured by Wako Junyaku K. K., was taken by a whole pipette, put into a 500 ml measuring flask and adjusted to 500 ml to obtain a mixed solution. This mixed solution had pH1.3.

TABLE 5

| Types of metal ions contained in the model aqueous solution | Concentration of metal ions in the feed aqueous solution (mg/l) | Concentration of metal ions in the treated solution (mg/l) |
|---|---|---|
| $Na^+$ | 9.6 | 9.6 |
| $K^+$ | 10.1 | 10.1 |
| $Fe^{3+}$ | 10.3 | 10.3 |
| $Ni^{2+}$ | 10.0 | 10.0 |
| $(AuCl_4)^-$ | 10.3 | 0.01 or less |
| $Pd^{2+}$ | 10.5 | 0.01 or less |
| $(PtCl_6)^{2-}$ | 9.8 | 0.04 |

Note:
In the above Table, the concentration of metal ions is the concentration as metal in all cases. (The same applies hereinafter.)

EXAMPLE 6

(1) Preparation of a metal ion-treating agent having 1,2,3,4-tetrahydroanthrahydroquinone supported on a solid porous carrier Supporting of 1,2,3,4-tetrahydroanthraquinone Into a 500 ml egg plant type flask, 100 ml of a synthetic adsorbent [styrene-divinylbenzene copolymer, specific surface area: 600 m$^2$, most frequent radius:100 Å, pore volume nitrogen: 1.08 ml/g, particle size: 0.4 –0.6 mm] (Sepabeads "SP207", tradename, manufactured by Mitsubishi Kasei Corporation) wetted with methanol, was introduced as a solid porous carrier. Then, 10 g of 1,2,3,4-tetrahydroanthraquinone (molecular weight:198) as an oxide of a reducing compound and 100 ml of isopropanol as a solvent were added thereto. Then, the flask was mounted on a rotary evaporator and heated on a hot bath at 80° C. while rotating the evaporator until solid 1,2,3,4-tetrahydroanthraquinone was dissolved and no longer visually observed, whereby dissolved 1,2,3,4-tetrahydroanthraquinone was adsorbed on the synthetic adsorbent. Further, the solvent was distilled off under a reduced pressure of 560 under heating at the same temperature, while maintaining the saturated solution state to prevent precipitation of crystals, so that 1,2,3,4-tetrahydroanthraquinone was adsorbed on the synthetic adsorbent, and the solvent was evaporated to dryness until finally the particle surface of the synthetic absorbent became a dried state.

This dried state synthetic adsorbent was put into 100 ml of cool methanol and thoroughly impregnated. Then, 1 l of deionized water was added thereto, and the mixture was stirred, whereupon floating non-adsorbed 1,2,3,4-tetrahydroanthraquinone not adsorbed on the synthetic adsorbent, was removed. Further, the same operation of washing with deionized water was conducted until 1,2,3,4-tetrahydroanthraquinone no longer floated. The obtained supporting product was maintained in a wetted state.

The amount of 1,2,3,4-tetrahydroanthraquinone adsorbed in this supporting product was measured, whereby the adsorbed amount was 0.2 mol per l of the synthetic adsorbent.

Preparation of metal ion-treating agent by reducing the 1,2,3,4-tetrahydroanthraquinone-supporting product 10 ml of the 1,2,3,4-tetrahydroanthraquinone-supporting product obtained in the above operation, was packed into a glass column (diameter:12 mm, height:150 mm). Then, under a nitrogen atmosphere, 50 ml of a 4 wt % sodium hydrosulfite aqueous solution was passed therethrough at room temperature at a space velocity (SV) of 4 hr$^{-1}$ for reduction treatment. Then, 50 ml of deionized water was passed therethrough for washing, to obtain a metal ion-treating agent (a 1,2,3,4 -tetrahydroanthrahydroguinone-supporting product) packed in the column.

(2) Treatment of an aqueous solution containing metal ions by means of the metal ion-treating agent Through the column packed with the treating agent prepared in the above step (1) of this Example, 100 ml of a model aqueous solution (pH 1.3) prepared in the same manner as in Example 5(2) and containing, as metal ions, ions (10 mg/l as calculated as metal ions) of sodium, potassium, iron (trivalent), nickel (bivalent), tetrachloroauric acid (trivalent as gold), palladium (bivalent) and hexachloroplatinic acid (tetravalent as platinum), was passed at room temperature at a space velocity (SV) of 2 hr$^{-1}$. The concentrations of the respective metal ions in the treated water passed through the column were measured, and the results were as shown in Table 6.

It is apparent from the results that noble metal ions were selectively captured, and the recovery rate was high.

TABLE 6

| Types of metal ions contained in the model aqueous solution | Concentration of metal ions in the feed aqueous solution (mg/l) | Concentration of metal ions in the treated solution (mg/l) |
|---|---|---|
| $Na^+$ | 10.3 | 10.2 |
| $K^+$ | 10.8 | 10.5 |
| $Fe^{3+}$ | 10.4 | 10.3 |
| $Ni^{2+}$ | 10.2 | 10.0 |
| $(AuCl_4)^-$ | 10.8 | 0.01 or less |
| $Pd^{2+}$ | 11.0 | 0.01 or less |
| $(PtCl_6)^{2-}$ | 10.1 | 0.01 or less |

EXAMPLE 7

(1) Preparation of a metal ion-treating agent having hydroquinone supported on a solid porous carrier Supporting of 1,4-benzoquinone Into a glass column (diameter:22 mm, height:300 mm), 50 ml of a synthetic adsorbent [styrenedivinybenzene copolymer, specific surface area:600 m$^2$, most frequent pore radius:100 Å, pore volume nitrogen:1.08 ml/g, particle size:0.4–0.6 mm] (Sepabeads "SP207", tradename, manufactured by Mitsubishi Kasei Corporation) wetted with methanol, was packed as a solid porous carrier. Then, a solution having 2 g of 1,4-benzoquinone as an oxide of a reducing compound dissolved in 1 l of methanol, was passed through this column at a space velocity (SV) of 2 hr$^{-1}$ to have 1,4-benzoquinone adsorbed on this synthetic adsorbent. Then, the 1,4-benzoquinone solution remaining in the column is substituted with 100 ml of a solution comprising 50 volume % of methanol and 50 volume % of water. Further, the methanol aqueous solution remaining in the column was substituted by deionized water. The amount of 1,4-benzoquinone adsorbed on this supporting product was measured, whereby it was 0.02 mol per l of the synthetic adsorbent.

Preparation of metal ion-treating agent by reducing the 1,4-benzoquinone-supporting product 10 ml of this 1,4-benzoquinone-supporting product was packed into a glass column (diameter:12 mm, height:150 mm). Then, under a nitrogen atmosphere, 25 ml of a 4 wt % sodium hydrosulfite aqueous solution was passed therethrough at room temperature at a space velocity (SV) of 4 hr$^-$ for reduction treatment. Then, 50 ml of deionized water was passed therethrough for washing, to obtain a metal ion-treating agent (a hydroquinone-supporting product) packed in the column.

(2) Treatment of an aqueous solution containing metal ions by means of the metal ion-treating agent Through the column packed with the treating agent prepared in the above step (1) of this Example, 100 ml of a model aqueous solution (pH 1.3) prepared in the same manner as in Example 5(2) and containing, as metal ions, ions (10 mg/l as calculated as metal ions) of sodium, potassium, iron (trivalent), nickel (bivalent), tetrachloroauric acid (trivalent as gold), palladium (bivalent) and hexachloroplatinic acid (tetravalent as platinum) was passed at room temperature at a space velocity (SV) of 2 hr$^{-1}$. The concentrations of the respective metal ions in the treated water passed through the column were measured, and the results were as shown in Table 7.

It is apparent from the results that noble metal ions were very selectively captured and the recovery rate was high.

TABLE 7

| Types of metal ions contained in the model aqueous solution | Concentration of metal ions in the feed aqueous solution (mg/l) | Concentration of metal ions in the treated solution (mg/l) |
|---|---|---|
| $Na^+$ | 9.6 | 9.6 |
| $K^+$ | 10.1 | 10.0 |
| $Fe^{3+}$ | 10.3 | 10.0 |
| $Ni^{2+}$ | 9.9 | 9.9 |
| $(AuCl_4)^-$ | 10.3 | 0.01 or less |
| $Pd^{2+}$ | 10.5 | 0.01 or less |
| $(PtCl_6)^{2-}$ | 9.8 | 0.01 or less |

EXAMPLE 8

(1) Preparation of metal ion-treating agent (using 2-ethylanthrahydroquinone as a reducing compound)

10 ml of the 2-ethylanthraquinone-supporting product prepared in Example 5(1) was packed into a glass column (diameter:12 mm, height:150 mm). Then, under a nitrogen atmosphere, 50 ml of a 4 wt % sodium hydrosulfite aqueous solution was passed therethrough at room temperature at a space velocity (SV) of 4 $hr^{-1}$ for reduction treatment. Then, 50 ml of deionized water was passed therethrough for washing, to obtain a metal ion-treating agent.

(2) Treatment of an aqueous solution containing silver thiosulfate complex salt by means of the metal ion-treating agent.

Through the column packed with the metal ion-treating agent prepared in the above step (1) of this Example, 6 l of a model waste water containing 60 mg/l of silver ions was passed at room temperature at a space velocity (SV) of 2 $hr^{-1}$. The results of the treatment were as shown in Table 8. Further, the metal ion-treating agent after passing 6 l of the model waste water, was taken out, washed with water and then dried in a nitrogen stream, and it was further incinerated in a crucible to obtain 353 mg of silver. Further, a part of the metal ion-treating agent was pulverized and analyzed by a powder X-ray diffraction method using a Cu vessel, whereby diffraction peaks attributable to silver metal as shown in Table 9 were confirmed.

This model waste water was prepared as follows to simulate the composition of a waste water discharged from the fixing process as a step for photographs. Namely, 200 g of ammonium thiosulfate, 15 g of anhydrous sodium sulfite and 15 ml of glacial acetic acid were added to 700 ml of water and dissolved. Then, the solution was diluted with water to a total volume of 1 l to obtain a fixing solution. To this fixing solution, 7.2 g of silver chloride was dissolved in a dark room, and the obtained solution was diluted 100 times to obtain a model waste water (pH 4.7). Here, the silver ions are dissolved in the form of silver thiosulfate complex ions $[Ag(S_2O_3)_2]^{3-}$ and $[Ag(S_2O_3)_3]^{5-}$.

TABLE 8

| Amount of the model waste water passed (ml) | Concentration of silver ions in the feed water (ppm) | Concentration of silver ions in the treated water (ppm) |
|---|---|---|
| 100 | 60 | 0.01 or less |
| 500 | 60 | 0.01 or less |
| 1000 | 60 | 0.01 or less |
| 2000 | 60 | 0.01 or less |
| 3000 | 60 | 0.01 or less |
| 4000 | 60 | 0.01 or less |
| 5000 | 60 | 0.01 or less |
| 5500 | 60 | 0.05 |
| 5750 | 60 | 2.5 |
| 6000 | 60 | 20 |

TABLE 9

| Diffraction angle 2θ | Relative intensity |
|---|---|
| 38.1 | 100 |
| 44.3 | 30 |
| 64.4 | 20 |
| 77.3 | 20 |

EXAMPLE 9

(Method for treating noble metal ions using a plurality of packed layers of metal ion-treating agents)

(1) Preparation of metal ion-treating agents

The quinone compound-supporting products prepared in the same manner as in Example 5(1) and Example 7(1) [the 2-ethylanthraquinone-supporting product in Example 5, and the 1,4-benzoquinone-supporting product in Example 7] were respectively packed into glass columns (diameter:12 mm, height:150 mm). Then, to each column, 50 ml of a 4 wt % sodium hydrosulfite aqueous solution was passed under a nitrogen atmosphere at room temperature at a space velocity (SV) of 4 $hr^{31}$ for reduction treatment. Then, 50 ml of deionized water was passed through each column for washing, to obtain a column packed with the metal ion-treating agent.

(2) Treatment of an aqueous solution containing metal ions by means of the metal ion-treating agents The columns packed with the respective metal ion-treating agents obtained in the above operation were arranged in series so that hydroquinone-supporting layer (hereinafter referred to as "HQ/SP207") was located above and the 2-ethylanthrahydroquinone-supporting layer (hereinafter referred to as "EAHQ/SP207") was located below. Then, 100 ml of a model waste water (pH 1.7) prepared as described below to contain 10 mg/l each of palladium (bivalent), iron (trivalent) and copper (bivalent), was supplied to the upper portion of the column at room temperature at a space velocity (SV) of 2 $hr^{-1}$.

The concentrations of the respective metal ions in the treating solution A discharged from the outlet of the upper column and the treating solution B discharged from the outlet of the lower column were measured, and the results were as shown in Table 10.

Preparation of the model waste water 5 ml each of the respective metal ion aqueous solutions i.e. ferric chloride in 0.1N hydrochloric acid (1000 mg/l as trivalent ions of iron), cupric chloride in 0.1N hydrochloric acid (1000 mg/l as bivalent ions of copper) and palladium chloride in 1N hydrochloric acid (1000 mg/l as bivalent ions of palladium) as standard solutions for atomic absorptiometry (manufactured by Wako Junyaku K. K.), was taken by a whole pipette, put into a 500 ml measuring flask and adjusted to 500 ml to obtain a mixed solution. This mixed solution had pH 1.7.

TABLE 10

| Type of metal ions | Concentration of metal ions in the feed solution of the model waste water (mg/l) | Concentration of metal ions in treated solution A from the upper column (HQ/SP207) (mg/l) | Concentration of metal ions in treated solution B from the lower column (EAHQ/SP207) (mg/l) |
|---|---|---|---|
| $Pd^{2+}$ | 10 | 0.01 or less | 0.01 or less |
| $Cu^{2+}$ | 10 | 10 | 0.01 or less |
| $Fe^{3+}$ | 10 | 10 | 10 |

EXAMPLE 10

(1) Preparation of a metal ion-treating agent having 2-(4-methyl-pentenyl)anthrahydroquinone supported on active carbon Supporting of 2-(4-methy-pentenyl)anthraquinone Into a flask, 0.6 g of 2-(4-methylpentenyl)anthraquinone was introduced and dissolved in 100 ml of methanol. To this solution, 10 ml of active carbon (Diahope 008, tradename, coal-based pulverized carbon, particle size: 0.42–1.70 mm) was added as a solid porous carrier, and the mixture was left to stand overnight. Then, the solvent was distilled off, and the product was washed with a small amount of methanol, and then the methanol was substituted by water.

The amount of 2-(4-methyl-pentenyl)anthraquinone adsorbed in this supporting product was measured, whereby the adsorbed amount was 0.2 mol per l of the synthetic adsorbent.

Preparation of a metal ion-treating agent by reducing the 2-(4-methyl-pentenyl)anthraquinone-supporting product 10 ml of the 2-(4-methyl-pentenyl)anthraquinone-supporting product obtained by the above operation, was packed into a glass column (diameter:12 mm, height:150 mm). Then, under a nitrogen atmosphere, 50 ml of a 4 wt % sodium hydrosulfite aqueous solution was passed therethrough at room temperature at a space velocity (SV) of 4 hr$^{-}$. Then, 50 ml of deionized water was passed therethrough for washing, to obtain a metal ion-treating agent (2-(4-methyl-pentenyl)anthrahydroquinone-supporting product) packed in the column.

(2) Treatment of an aqueous solution containing metal ions by means of the metal ion-treating agent Through the column packed with the treating agent prepared in the above step (1) of this Example, 200 ml of a model aqueous solution (pH 1.3) prepared in the same manner as in Example 5 (2) and containing, as metal ions, ions (10 mg/l as calculated as metal ions) of sodium, potassium, iron (trivalent), nickel (bivalent), tetrachloroauric acid (trivalent as gold), palladium (bivalent) and hexachloroplatinic acid (tetravalent as platinum), was passed at room temperature at a space velocity (SV) of 2 hr$^{-1}$. The concentrations of the respective metal ions in the treated water passed through the column were measured, and the results were as shown in Table 11.

It is apparent from these results that noble metal ions were selectively captured, and the recovery rate was high.

TABLE 11

| Types of metal ions contained in the model aqueous solution | Concentration of metal ions in the feed aqueous solution (mg/l) | Concentration of metal ions in the treated solution (mg/l) |
|---|---|---|
| $Na^+$ | 9.6 | 9.6 |
| $K^+$ | 10.1 | 9.8 |
| $Fe^{3+}$ | 10.3 | 10.3 |
| $Ni^{2+}$ | 9.9 | 9.9 |
| $(AuCl_4)^-$ | 10.3 | 0.01 or less |
| $Pd^{2+}$ | 10.5 | 0.01 or less |
| $(PtCl_6)^{2-}$ | 9.8 | 0.5 |

EXAMPLE 11

(Repeated use of a metal ion-treating agent)

(1) Preparation of a metal ion-treating agent having 2-ethylanthraquinone supported on active carbon Supporting of 2-ethylanthraquinone Into a 500 ml egg plant type flask, 150 ml of coal-based granular active carbon (Diahope C, tradename, manufactured by Mitsubishi Kasei Corporation) wetted with methanol and then deaerated, 50 g of 2-ethylanthraquinone and 100 ml of isopropanol were added, and the flask was mounted on a rotary evaporator and heated in a hot bath of 80° C. to dissolve 2-ethylanthraquinone. Then, the solvent was distilled off mildly under reduced pressure (not lower than 560 mmHg) to have 2-ethylanthraquinone adsorbed on the active carbon. To the active carbon, 100 ml of methanol was added and thoroughly impregnated. Then, 1 l of deionized water was added thereto, and the mixture was stirred, whereby floating non-adsorbed 2-ethylanthraquinone was removed. Further, the same washing treatment with 300 ml of deionized water was repeated three times, and the obtained supporting product was maintained in a wetted state.

The amount of 2-ethylanthraquinone adsorbed in this supporting product was 1.0 mol per l of the active carbon.

Preparation of a metal ion-treating agent by reducing the 2-ethylanthraquinone-supporting product 10 ml of the supporting product obtained in the above operation was introduced into 100 ml of an Erlenmeyer flask, and 100 ml of deionized water and 4 g of sodium hydrosulfite were added. The mixture was stirred and left to stand for 30 minutes under a sealed condition for reduction. Then, the product was packed into a glass column of 11 mmφ×150 mm and washed with 100 ml of deionized water bubbled with nitrogen, to obtain a metal ion-treating agent (2-ethylanthrahydroquinone-supporting product).

(2) Treatment of an aqueous solution containing metal ions by means of the metal ion-treating agent Preparation of a model waste water of a wash water in the step of fixing process To 700 ml of deionized water, 200 g of ammonium thiosulfate, 15 g of anhydrous sodium sulfite and 15 ml of acetic acid were added and dissolved, and then diluted with deionized water to 1 l. To this solution, 7.2 g of silver chloride was dissolved in a darkroom to obtain a solution as the stock solution, which was diluted 100 times to obtain a solution, which was used as the model waste water (soluble in the form of silver thiosulfate complex ions, silver concentration:50 ppm, pH 5.0).

Treatment of an aqueous solution of metal ions

The model waste water of a fixing solution prepared as described above, was adjusted to pH 8.2 by an addition of sodium hydroxide solution. Then, it was passed through the column at a space velocity (SV) of 2 hr$^{-1}$. After break through, the treating agent was washed with 100 ml of deionized water, and 100 ml of a 4 to 8% sodium hydrosulfite solution was passed therethrough at a space velocity (SV) of from 4 to 10 hr$^{-1}$ for reduction treatment, and then it was washed with 50 ml of deionized and nitrogen-substituted waster, as shown in Table 12. Then, the model waste water of a fixing solution adjusted to pH 8.2 was again passed through the column at a space velocity (SV) of 2 hr$^{-1}$. This operation was repeated the number of times as shown in Table 12 to obtain the results of Table 12. The silver concentration in the treated solution was measured by an IPC emission spectrometry (the same applies hereinafter).

As a result, it was found that the ability did not decrease even if the metal ion-treating agent was repeatedly used.

TABLE 12

| Number of times | $Na_2S_2O_4$ (g) | Amount of treated solution (l) | Amount of captured silver (mg) | Quinone-utilizing efficiency (mol %) | Amount of silver ions in the treated water (ppm) |
|---|---|---|---|---|---|
| 1 | 8 | 6.1 | 305 | 14 | 0.01 or less |
| 2 | 4 | 2.4 | 120 | 5 | 0.05 or less |
| 3 | 4 | 2.8 | 138 | 6 | 0.05 or less |
| 4 | 4 | 2.3 | 117 | 5 | 0.05 or less |
| 5 | 6 | 4.8 | 240 | 11 | 0.05 or less |
| 6 | 8 | 8.2 | 438 | 20 | 0.05 or less |

Notes:
(1) The amount of captured silver means the amount of silver captured until the break through point, when the point at which the concentration of leaked silver reached 1 ppm, was taken as the break through point.
(2) The quinone-utilizing efficiency represents the ratio of the actual amount of captured silver to the theoretical amount of silver which the supported hydroquinone compound can capture by reducing silver ions.
(3) The amount of treated solution represents the amount of the solution treated until the break through point.
These notes are applicable hereinafter.

EXAMPLE 12

Repeated use of a metal ion-treating agent (1) Preparation of a metal ion-treating agent having 2-ethylanthraquinone supported on a synthetic adsorbent Supporting of 2-ethylanthraquinone Into a 10 l flask, 2.5 l of a synthetic polymer adsorbent (Sepabeads SP207, tradename, manufactured by Mitsubishi Kasei Corporation) wetted with methanol and then deaerated, 354 g of 2-ethylanthraquinone and 2.5 l of isopropanol were added. Then, the flask was mounted on a rotary evaporator and heated in a hot bath at 80° C. to dissolve 2-ethylanthraquinone. Then, the solvent was distilled off mildly under reduce pressure (not lower than 560 mmHg) to have 2-ethylanthraquinone adsorbed on the synthetic polymer adsorbent. To the synthetic polymer adsorbent, 2 l of methanol was added and thoroughly impregnated. Then, 10 l of deionized water was added thereto, and the mixture was stirred, whereby floating non-adsorbed 2-ethylanthraquinone was removed. Further, washing treatment with deionized water was repeated until non-adsorbed 2-ethylanthraquinone no longer floated, and the obtained supporting product was maintained in a wetted state.

The amount of 2-ethylanthraquinone adsorbed in this supporting product was 0.47 mol per l of the synthetic polymer adsorbent.

Preparation of a metal ion-treating agent by reducing the 2-ethylanthraquinone-supporting product 10 ml of the supporting product obtained by the above operation was packed into a glass column of 11 mm$\phi$×150 mm, and 50 ml of a 4% sodium hydrosulfite solution was passed therethrough at a space velocity (SV) of 4 hr$^{-1}$. Then, it was washed with 100 ml of deionized water flushed with nitrogen, to obtain a metal ion-treating agent (2-ethylanthrahydroquinone-supporting product).

(2) Treatment of an aqueous solution containing metal ions by means of the metal ion-treating agent Treatment of an aqueous solution containing metal ions The model waste water prepared in Example 11 was passed through the column at a space velocity (SV) of 2 hr$^{-1}$. After the break through, it was washed with 100 ml of deionized water, from 50 to 100 ml of a 4 to 8% sodium hydrosulfite solution was passed therethrough at a space velocity (SV) of from 4 to 10 hr$^{-1}$ for reduction treatment, and then it was washed with 50 ml of deionized water bubbled with nitrogen, as shown in Table 13. Then, the model waste water was passed therethrough at a space velocity (SV) of 2 hr$^{-1}$. This operation was repeated the number of times as shown in Table 13 to obtain the results of Table 13. The concentration of silver ions in the treated water until the break through was not higher than 0.01 ppm in the first operation and was not higher than 0.05 ppm in the second and subsequent operations.

As a result, it was found that the ability did not decrease even when the metal ion-treating agent was repeatedly used.

TABLE 13

| Number of times | $Na_2S_2O_4$ (g) | Amount of treated solution (l) | Amount of captured silver (mg) | Quinone-utilizing efficiency (mol %) |
| --- | --- | --- | --- | --- |
| 1 | 2 | 4.8 | 240 | 24 |
| 2 | 2 | 4.8 | 246 | 24 |
| 3 | 4 | 5.0 | 250 | 25 |
| 4 | 5 | 3.8 | 198 | 20 |
| 5 | 6 | 3.2 | 166 | 16 |
| 6 | 8 | 3.8 | 206 | 20 |

EXAMPLE 13

Influence of pH over the metal ion-treating agent (1) Preparation of a metal ion-treating agent having 2-ethylanthraquinone supported on active carbon Supporting of 2-ethylanthraquinone 2-ethylanthraquinone was supported on active carbon in same manner as in Example 11 except that 20 g of 2-ethylanthraquinone was used, and the obtained supporting product was maintained in a wetted state.

The amount of 2-ethylanthraquinone adsorbed in this supporting product was 0.56 mol per l of active carbon.

Preparation of a metal ion-treating agent by reducing the 2-ethylanthraquinone-supporting product 10 ml of the supporting product obtained in the above operation was introduced into a 100 ml Erlenmeyer flask, and 100 ml of deionized water and 4 g of sodium hydrosulfite were added thereto. The mixture was stirred and then left to stand for 30 minutes in a sealed condition. Then, the product was packed into a glass column of 11 mm$\phi$×150 mm and washed with 100 ml of deionized water bubbled with nitrogen, to obtain a column of a metal ion-treating agent (a 2-ethylanthrahydroquinone-supporting product). A total of five sets of columns packed with the metal ion-treating agent were prepared in the same manner.

(2) Treatment of an aqueous solution containing metal ions by means of the metal ion-treating agent Treatment of an aqueous solution containing metal ions Five sets of the model waste water prepared in Example 11, were prepared. To the respective sets, sodium hydroxide was added to adjust the pH to 5, 5.5, 7.5, 8.2 and 9.5, respectively. Then, model waste waters having different pH were respectively, passed through the five sets of columns at a space velocity (SV) of 2 hr$^{-1}$, whereby the amounts of captured silver were examined. The results are shown in Table 14 and FIG. 2. Further, the theoretical amount of captured silver is 1231 mg.

TABLE 14

| pH | Amount of NaOH (mg/l) | Amount of treated solution (l) | Amount of captured silver (mg) | Quinone-utilizing efficiency (mol %) |
| --- | --- | --- | --- | --- |
| 5 | 0 | 0.5 | 26.5 | 2.1 |
| 5.5 | 20 | 1.7 | 85 | 7 |
| 7.5 | 60 | 3.6 | 180 | 14.6 |
| 8.2 | 130 | 4.2 | 210 | 17.1 |
| 9.5 | 350 | 4.0 | 200 | 16.2 |

EXAMPLE 14

(Treatment of palladium ions, rhodium ions and ruthenium ions by means of a metal ion-treating agent)

(1) Preparation of a metal ion-treating agent having 2-ethylanthraquinone supported on a synthetic polymer adsorbent Supporting of 2-ethylanthraquinone The operation was conducted in the same manner as in Example 12 to obtain the same results. The amount of 2-ethylanthraquinone adsorbed in this supporting product was 0.47 mol per l of the synthetic polymer adsorbent.

Preparation of a metal ion-treating agent by reducing the 2-ethylanthraquinone-supporting product 10 ml of the supporting product obtained in the above operation was packed into a glass column of 11 mm$\phi$×150 mm, and 50 ml of a 4% sodium hydrosulfite solution was passed therethrough. Then, it was washed with 100 ml of deionized water bubbled with nitrogen, to obtain a metal ion-treating agent (a 2-ethylanthrahydroquinone-supporting product).

(2) Treatment of an aqueous solution containing metal ions by means of the metal ion-treating agent preparation of metal ion solutions (a) Preparation of a palladium solution
   1.9 g of palladium chloride ($PdCl_2$) was dissolved in 500 ml of deionized waster to obtain a stock solution, which was diluted 100 times to obtain the palladium solution ($Pd^{2+}$:22 ppm).
(b) Preparation of a rhodium solution
   54 mg of rhodium chloride ($RhCl_3.3H_2O$) was dissolved in 1 l of deionized water to obtain the rhodium solution ($Rh^{3+}$:20 ppm).
(c) Predation of a ruthenium solution
   40 mg of ruthenium chloride ($RuCl_3.nH_2O$ (n=1 to 3)) was dissolved in 250 ml of deionized water to obtain the ruthenium solution ($Ru^{3+}$:20 ppm).

Treatment of an aqueous solution containing metal ions

Through the column prepared as described above, the above mentioned three types of metal ion-containing solutions were passed at a space velocity (SV) of 2 hr$^-$. The amounts of captured metals until the break through are as shown in Table 15. The concentrations of the respective metal ions in the treated waters were not higher than 0.01 ppm in all cases.

TABLE 15

| Type of metal ions | Amount of treated solution (l) | Amount of captured metal (mg) | Quinone-utilizing efficiency (mol %) |
| --- | --- | --- | --- |
| $Pd^{2+}$ | 7.7 | 168 | 34 |
| $Ph^{3+}$ | 4.6 | 92 | 29 |
| $Ru^{3+}$ | 4.3 | 86 | 27 |

EXAMPLE 15

(Preparation of a metal ion-treating agent by supporting a reagent on active carbon by means of an aqueous solution of an alkali metal salt of an anthrahydroquinone compound, and measurement of the supported amount)

(1) Preparation of a metal ion-treating agent having 1,4-dihydro-9,10-dihydroxyanthracene (also called 1,4-dihydroanthrahydroquinone, hereinafter referred to simply as DDA) supported on active carbon A test for adsorbing a reagent on active carbon was conducted as described below by changing the concentration of the aqueous solution of the disodium salt of DDA (as mentioned above, the concentration is the concentration as calculated as anthraquinone).

(a) Into a 500 ml egg plant type flask, 100 ml (40 g) of coal-based particulate active carbon (Diahope C, tradename, manufactured by Mitsubishi Kasei Corporation) impregnated with deionized water and deaerated, and 175 ml of deionized water were added and left to stand under reduced pressure for one hour. Then, under a nitrogen atmosphere, 25 ml of an aqueous solution of a disodium salt of DDA having a concentration of 22% (specific gravity: 1.17 at 20° C.) was added thereto, followed by adsorption under reduced pressure for 2 hours. Then, under a nitrogen atmosphere, the supernatant was separated by a centrifugal separator. Then, while conducting centrifugal separation, the product was washed with 100 ml of a 4% sulfuric acid aqueous solution and then put into a 150 ml sample bottle. Then, deionized water subjected to nitrogen bubbling treatment, was filled, and the product was then stored.

(b) Into a 500 ml egg plant type flask, 100 ml (40 g) of coal-based particulate active carbon (Didhope C, tradename, Manufactured by Mitsubishi Kasei Corporation) impregnated with deionized water and deaerated, and 160 ml of deionized water were added, and left to stand for one hour under reduced pressure. Then, under a nitrogen atmosphere, 40 ml of an aqueous solution of a disodium salt of DDA having a concentration of 22%, was added, followed by adsorption under reduced pressure for 2 hours. Under a nitrogen atmosphere, the supernatant was separated by a centrifugal separator. Then, while conducting centrifugal separation, the product was washed with 100 ml of a 10% of sulfuric acid aqueous solution, and then put into a 150 ml sample bottle. Then, deionized water subjected to nitrogen bubbling treatment, was filled in the bottle, and the product was then stored.

(c) Into a 500 ml egg plant type flask, 100 ml (40 g) of coal-based particular active carbon (Diahope C, tradename, manufactured by Mitsubishi Kasei Corporation) impregnated with deionized water and deaerated, and 140 ml of deionized water were added and left to stand under reduced pressure for one hour. Then, under a nitrogen atmosphere, 60 ml of an aqueous solution of a disodium salt of DDA having a concentration of 22% was added thereto, followed by adsorption under reduced pressure for 2 hours. Under a nitrogen atmosphere, the supernatant was separated by a centrifugal separator. Then, while conducting centrifugal separation, the product was washed with 100 ml of a 10% of sulfuric acid aqueous solution and the put into 150 ml sample bottle. Deionized water subjected to nitrogen bubbling treatment, was filed in the bottle, and the product was then stored.

(d) Into a 500 ml egg plant type flask, 100 ml (40 g) of coal-based particulate active carbon (Didhope C, tradename, manufacture by Mitsubishi Kasei Corporation) was introduced, and an operation of reducing the pressure and blowing nitrogen in, was repeated to substitute oxygen in the pores of the active carbon by nitrogen. Then, under a nitrogen atmosphere, 200 ml of an aqueous solution of a disodium salt of DDA having a concentration of 22%, was added, followed by adsorption under reduced pressure for 2 hours. Under a nitrogen atmosphere, the supernatant was separated by a centrifugal separator. Then, while conducting centrifugal separation, the product was washed with 200 ml of a 5% of sulfuric acid aqueous solution and then further impregnated in 100 ml of a 5% sulfuric acid aqueous solution. Then, the supernatant was again separated by a centrifugal separator, and the product was put into a 150 ml sample bottle. Deionized water subjected to nitrogen bubbling treatment, was filled in the bottle, and the product was then stored.

(2) Measurement of the supported amounts

A method for measuring the amount of DDA supported on the metal ion-treating agent prepared in the above step (1) was as follows. Namely, 10 ml of each of the four types of metal ion treating agents (a) to (d) was subjected to Soxlet extraction with a solvent mixture of acetone:methanol (1:1), and then extracted again with toluene. The extract solution was dried up, and the weight of the residue was measured and calculated as anthraquinone to obtain the adsorbed amount. The results are shown in Table 16. The results show that even when a 22% disodium salt of DDA aqueous solution was used, the maximum adsorption was about 0.8 mol/l—carrier.

TABLE 16

| Example 15 Test No. | Amount of the DDA $Na_2$ aqueous solution used (mol/100 ml of AC) | Equilibrium concentration (mol/l) | Adsorbed amount (mol/l of AC) |
| --- | --- | --- | --- |
| 15-a | 0.03 | $7.5 \times 10^{-3}$ | 0.30 |
| 15-b | 0.05 | 0.05 | 0.39 |
| 15-c | 0.07 | 0.12 | 0.50 |
| 15-d | 0.25 | 0.87 | 0.75 |

Notes:
(1) AC represents active carbon
(2) The equilibrium concentration represents the amount of $DDANa_2$ in the solution after the equilibrium adsorption was reached.

EXAMPLE 16

(A metal ion-treating agent having DDA supported on active carbon, and treatment of an aqueous solution containing silver complex ions)

(1) Preparation of a metal ion-treating agent having DDA supported on active carbon ↑ Supporting of DDA Into a 200 ml egg plant type flask, 50 ml (20 g) of coal-based particulate active carbon (Diahope C, tradename, manufactured by Mitsubishi Kasei Corporation) wetted with deionized water and then deaerated, and 40 ml of deionized water were added, and left to stand under reduced pressure for 1 hour. Then, under a nitrogen atmosphere, 200 ml of an aqueous solution containing 10% of a disodium salt of DDA was added. Under a nitrogen atmosphere, adsorption was conducted for 4 hours with stirring from time to time. Under a nitrogen atmosphere, the supernatant was removed by decantation, and the residue was packed into a glass column of 22 mm$\phi$×300 nun and washed with 150 ml of deionized water having the dissolved oxygen substituted by nitrogen. Under a nitrogen atmosphere, the product was transferred into a 150 ml sample bottle, and the supernatant was removed by decantation. The product was then stored.

The adsorbed amount of this supported product was measured in the same manner as in Example 15 and found to be 0.53 mol/l—active carbon.

2 Supporting of anthrahydroquinone

Into a 200 ml egg plant type flask, an aqueous solution comprising of 2.4 g of sodium hydroxide, 8.5 g of sodium hydrosulfite and 50 ml of deionized water was introduced, and 50 ml of active carbon thoroughly deaerated and wetted with deionized water, was added under a nitrogen atmosphere. The mixture was stirred. Then, 6 g of anthraquinone pulverized at room temperature, was added thereto, and the mixture was left to stand for 4 hours for adsorption. Then, the product was subjected to filtration under a nitrogen atmosphere, and washed with 50 ml of 5% dilute sulfuric acid and three times with 50 ml of deionized water subjected to nitrogen bubbling treatment. Then, it was transferred to 150 ml sample bottle under a nitrogen atmosphere. The product was then stored.

The adsorbed amount of this supporting product was measured in the same manner in Example 15 and found to be 0.41 mol/l—active carbon.

(2) Treatment of an aqueous solution containing metal ions by means of the metal ion-treating agent Preparation of a model waste water of a wash water in the step of fixing process The model waste water was prepared in the same manner as in Example 11 (dissolved in the form of silver thiosulfate complex ions, silver concentration:50 ppm, pH 5.0).

Treatment of an aqueous solution containing metal ions (a) 10 ml of the metal ion-treating agent prepared in the above step (1)-1 was taken and packed into a column of 11 mm$\phi$×150 mm. The model waste water was adjusted to pH 8.2 by an addition of aqueous sodium hydroxide solution and then passed through the column at a space velocity (SV) of 2 hr$^{-1}$ (20 ml/hr). The results of treatment are shown in Table 17.

(b) 10 ml of the metal ion-treating agent (DDA-supporting active carbon product) prepared in the above step (1)-1 was taken into a 100 ml Erlenmeyer flask, and in view of the possibility of being oxidized during the storage, 100 ml of a 4% sodium hydrosulfate aqueous solution was added thereto. The mixture was left to stand for 30 minutes under a sealed condition. Then, it was packed into a column of 11 mm$\phi$×150 mm. The model waste water was adjusted to pH 8.2 by an addition of aqueous sodium hydroxide solution and then passed through the column at a space velocity (SV) of 2 hr$^{-1}$ (20 ml/hr). The results of the treatment are shown in Table 17.

(c) 10 ml of the metal ion-treating agent (anthrahydroquinone-supporting active carbon product) prepared in the above step (1)-2, was taken and packed into a column of 11 mm$\phi$×150 mm. The model waste water was adjusted to pH 8.2 by an addition of aqueous sodium hydroxide solution and then passed through the column at a space velocity (SV) of 2 hr$^{-1}$ (20 ml/hr). The results of the treatment are shown in Table 17.

TABLE 17

| No. | Amount of treated solution (l) | Theoretical amount of captured silver (mg) | Amount of captured silver (mg) | Quinone-utilizing efficiency (mol %) |
| --- | --- | --- | --- | --- |
| 16-a | 19 | 1145 | 950 | 83 |
| 16-b | 20 | 1145 | 992 | 87 |
| 16-c | 4 | 886 | 200 | 23 |

EXAMPLE 17

(A metal ion-treating agent having DDA supported on active carbon, and treatment of a waste water of a wash solution in the step of fixing process (silver: 60 ppm)).

(1) Preparation of metal ion-treating agent having DDA supported on active carbon Supporting of DDA Into a 300 ml egg plant type flask, 100 ml (39 g) of coal-based particulate active carbon (Didhope C, tradename, manufactured by Mitsubishi Kasei Corporation) wetted with deionized water and deaerated, was introduced, and an operation of reducing the pressure and substituting nitrogen, was repeated to substitute oxygen in the pores of active carbon by nitrogen. Then, 200 ml of an aqueous solution containing 22% of a disodium salt of DDA, was added, followed by adsorption under reduced pressure for one hour. The product was filtered under suction, under nitrogen atmosphere. The supporting product was washed with 200 ml of deionized water having the dissolved oxygen substituted by nitrogen, and transferred into a 150 ml sample bottle under a nitrogen atmosphere. Deionized water bubbled with nitrogen, was filled into the bottle. The product was then stored.

The adsorbed amount of this supporting product was measured in the same manner as in Example 15 and was found to be 0.53 mol/l—active carbon.

(2) Treatment of the waste water (silver: 60 ppm)

5 ml of the metal ion-treating agent prepared in the above step (1) was packed into a column of 12 mm$\phi$×150 mm. The waste water (silver: 60 ppm) was adjusted to pH 8.5 and then passed through the column at a space velocity (SV) of 4 hr$^{-1}$. The results of the treatment are shown in Table 18. The silver concentration in the treated water was not higher than 0.1 ppm.

TABLE 18

| No. | Amount of treated solution (l) | Theoretical amount of captured metal (mg) | Amount of captured metal (mg) | Quinone-utilizing efficiency (mol %) |
|---|---|---|---|---|
| 17 | 6.1 | 572 | 366 | 64 |

EXAMPLE 18

(A metal ion-treating agent having DDA supported on porous silica or a synthetic polymer adsorbent, and treatment of palladium ions (an aqueous palladium chloride solution) by mean of this treating agent)

(1) Preparation of a metal ion-treating agent having DDA supported on porous silica or a synthetic polymer adsorbent

Supporting of DDA

Into 300 ml egg plant type flasks, 50 g of porous silica (N-608, tradename, manufactured by Nikki Kagaku K. K., data obtained by mercury injection method:average pore diameter:120 Å, accumulated pore volume:0.59 cc/g, accumulated pore specific surface area:97.6 m$^2$/g) of a cylindrical shape (3 mm$\phi$×8 mm) and a synthetic polymer adsorbent wetted with deionized water and then deaerated, (the same as in Example 1) were respectively introduced. Then, 100 ml of deionized water was added to each flask. Further, an operation of reducing the pressure and substituting with nitrogen, was respectively repeated to substitute oxygen in the carrier by nitrogen. Then, under a nitrogen atmosphere, respectively 40 ml of an aqueous solution containing 22% of a disodium salt of DDA, was added into each flask, followed by adsorption under reduced pressure for 2 hours. Under a nitrogen atmosphere, the product was subjected to filtration under suction, and the supporting product was washed with 100 ml of deionized water having dissolved oxygen substituted by nitrogen. Then, under a nitrogen atmosphere, it was washed with 100 ml of a 10% sulfuric acid aqueous solution and then transferred into a 150 ml sample bottle. The supernatant was removed by decantation, and the product was then stored.

The adsorbed amounts of these supporting products were measured in the same manner as in Example 15, whereby the adsorbed amount was 0.24 mol/l—carrier with the porous silica carrier, and 0.22 mol/l—carrier with the synthetic polymer adsorbent carrier.

(2) Treatment of a palladium ion model waste water 10 g of each of the two types of metal ion-treating agents prepared in the step (1) was added to 100 ml of a palladium ion model waste water (215 ppm as Pd) prepared from palladium (II) chloride and deionized water. Six hours later and 24 hours later, the supernatant was sampled, and the concentration of palladium remaining in the supernatant and the amount of palladium adsorbed on the carrier were measured by an ICP emission spectrometry. The results are shown in Table 19.

TABLE 19

| | Time for adsorption | | | |
|---|---|---|---|---|
| | 6 hours | | 24 hours | |
| Type of the carrier | Concentration of Pd in the supernatant (ppm) | Adsorbed amount of Pd (mg) | Concentration of Pd in the supernatant (ppm) | Adsorbed amount of Pd (mg) |
| Porous silica | 88.3 | 12.7 | 47.9 | 16.7 |
| Synthetic polymer adsorbent | 20.7 | 19.4 | 3.7 | 21.1 |

According to the present invention, a redox reagent is supported on a solid porous carrier, whereby complete removal or economical repeated use as a metal ion-treating agent has been made possible. For example, when this is used as an agent for treating metal ions in a waste water, bivalent metal ions contained in the aqueous solution are selectively converted to monovalent metal ions, and the bivalent metal ions are separated, accumulated and captured on the solid porous carrier from the aqueous solution by the reduction treatment, whereby they can be completely removed, or the monovalent metal ions can efficiently be recovered from the aqueous solution without being subjected to any further reduction. Further, the present invention has realized a system whereby the monovalent metal ions can be eluted and reused irrespective of the scale, and the handling is very simple.

Furthermore, by using the metal ion-treating agent of the present invention, metal ions in an aqueous solution, particularly noble metal ions, can selectively be recovered as metals at a high recovery rate. Further, it is also effective for recovery of silver complex ions as contained in a waste water from a fixing process of photograph industry by preparing metal treating agents using a plurality of reducing compounds such as hydroquinone compounds having suitable equilibrium oxidation-reduction potentials, the selectivity of metal ions can be further improved. The treating agent of the present invention can be prepared by a method of supporting a reducing compound on a porous carrier mainly by adsorption, and it is possible to use as starting materials those which are commercially available, whereby metal ion treating agents having various oxidation-reduction potentials can be prepared, and the preparation is easy. Whereas, conventional oxidation-reduction resins or chelate resins require special starting materials, and their production processes involve long steps. With the chelate resins, selectivity to capture noble metal ions tends to be poor when other metal ions coexist, and metal complex ions can hardly be removed.

We claim:

1. An agent for treating metal ions in an aqueous solution, comprising a solid porous carrier and, supported thereon, an organic reagent (hereinafter referred to as a "redox reagent") which is capable of converting metal ions (inclusive of metal complex ions) contained in an aqueous solution to zero valent metal or monovalent metal ions by a redox reaction and which is capable of carrying out oxidation-reduction reversibly.

2. The metal ion-treating agent according to claim 1, wherein the redox reagent is a compound having a hydroquinone or quinone structure, capable of carrying out a hydroquinone-quinone type redox reaction.

3. The metal ion-treating agent according to claim 2, wherein the compound having a hydroquinone structure is a hydroquinone (dihydroxybenzene) compound, a naphthohydroquinone compound or an anthrahydroquinone compound, and the compound having a quinone structure is a benzoquinone compound, a naphthoquinone compound or an anthraquinone compound.

4. The metal ion-treating agent according to claim 1, wherein the solid porous carrier is organic synthetic polymer particles, active carbon or silicon dioxide, or a molded product thereof.

5. The metal ion-treating agent according to claim 1, wherein the metal ions to be converted to zero valent metal by a redox reaction have an equilibrium oxidation-reduction potential of the metal ion-metal system, which is higher than the equilibrium oxidation-reduction potential of the redox reagent supported on the solid porous carrier.

6. The metal ion-treating agent according to claim 1, wherein the metal ions are noble metal ions.

7. The metal ion-treating agent according to claim 6, wherein the noble metal ions are ions of gold, silver, platinum, palladium, rhodium or ruthenium, or complex ions of such a noble metal.

8. The metal ion-treating agent according to claim 7, wherein the complex ions of a noble metal are silver thiosulfate complex ions, tetrachloroauric acid ions or hexachloroplatinic acid ions.

9. The metal ion-treating agent according to claim 1, wherein the aqueous solution is a waste water discharged from a step for fixing processes in the photograph industry.

10. The metal ion-treating agent according to claim 1, wherein the metal ions are bivalent metal ions, which can be converted to monovalent metal ions by a redox reaction.

11. The metal ion-treating agent according to claim 10, wherein the bivalent metal ions are copper ions or mercury ions.

12. The metal ion-treating agent according to claim 1, which is prepared by supporting on the solid porous carrier a quinone compound as a redox reagent of oxidized form, followed by reduction treatment.

13. A process for producing the metal ion-treating agent as defined in claim 1, which comprises mixing a solid porous carrier to a solution comprising a quinone compound as a redox reagent of oxidized form and a solvent capable of dissolving the reagent, then gradually distilling off the solvent to have the reagent adsorbed on the solid porous carrier under saturated condition, if necessary exchanging the solvent or evaporating it to dryness, to have the reagent supported on the carrier, then washing off the redox reagent not supported on the solid porous carrier, with deionized water, followed by reduction treatment.

14. The process according to claim 13, wherein the quinone compound is an anthraquinone compound.

15. A process for producing the metal ion-treating agent as defined in claim 1, which comprises immersing a solid porous carrier in an aqueous solution of an alkali metal salt of a compound having a hydroquinone structure to have compound adsorbed on the porous carrier, then separating the porous carrier, followed by washing treatment.

16. The process according to claim 15, wherein the compound having a hydroquinone structure is an anthrahydroquinone compound.

17. The process according to claim 16, wherein the anthrahydroquinone compound is 1,4-dihydro-9,10-dihydroxyanthrancene.

18. A system for treating metal ions in an aqueous solution, which comprises connecting containers accommodating the metal ion-treating agent as defined in claim 1, in series or in parallel in a pipeline so that bivalent metal ions contained in an aqueous solution can be selectively reduced in the aqueous solution flowing in the pipeline, introducing a feed aqueous solution containing bivalent metal ions to be treated, to reduce the bivalent metal ions to monovalent metal ions, if necessary, supplying a solution for eluting the monovalent metal ions separated, accumulated and captured on the solid porous carrier, to elute the monovalent metal ions out of the system, then supplying a reducing agent to the containers accommodating the metal ion-treating agent, to restore the metal ion-treating agent to be effective again for the reduction reaction system, and repeating the selective reduction treatment of the bivalent metal ions in the aqueous solution to the monovalent metal ions, so that the bivalent metal ions in the aqueous solution are recovered in the form of the monovalent metal ions.

19. A method for treating metal ions in an aqueous solution, which comprises supplying an aqueous solution containing noble metal ions (inclusive of noble metal complex ions) to a container packed with the metal ion-treating agent as defined in claim 1, to reduce and capture on the metal ion-treating agent said noble metal ions in the form of zero valent metal, subjecting the metal ion-treating agent oxidized to such an extent that it can no longer substantially capture the noble metal ions, to reduction treatment for restoration, and repeating the treatment of noble metals by supplying the aqueous solution containing the noble metals.

20. The method according to claim 18 or 19, wherein the aqueous solution is a waste water.

21. A method for treating metal ions in an aqueous solution, which comprises recovering silver thiosulfate complex ions from an aqueous solution containing them by capturing them in the form of silver metal on a metal ion-treating agent having an anthrahydroquinone compound supported on active carbon, wherein the pH of the aqueous solution is adjusted at a level of at least 7.

22. The method according to claim 21, wherein the pH of the aqueous solution is at least 8.

23. The method according to claim 21 or 22, wherein the pH of the aqueous solution is at most 12.

24. The method according to claim 21, 22 or 23, wherein the aqueous solution containing silver thiosulfate complex ions is a waste water discharged from a step for fixing processes in the photograph industry.

\* \* \* \* \*